US005521991A

United States Patent [19]

Billings

[11] Patent Number: 5,521,991

[45] Date of Patent: May 28, 1996

[54] METHOD AND SYSTEM FOR FAST FORMS RECOGNITION OF DOCUMENT FORM IMAGES

[75] Inventor: Douglas W. Billings, Gaithersburg, Md.

[73] Assignee: International Business Machines Corporation, Armonk, N.Y.

[21] Appl. No.: 143,518

[22] Filed: Oct. 29, 1993

[51] Int. Cl.⁶ .................................................. G06K 9/20
[52] U.S. Cl. ............................................. 382/317; 382/282
[58] Field of Search .................................. 382/61, 30, 56, 382/41, 317, 192, 193, 194, 203, 209, 233, 243, 282; 358/453; 395/148, 149

[56] References Cited

U.S. PATENT DOCUMENTS

| | | | |
|---|---|---|---|
| 4,021,777 | 5/1977 | Shepard | 382/61 |
| 4,410,965 | 10/1983 | Moore | 365/230 |
| 4,503,556 | 3/1985 | Scherl et al. | 382/9 |
| 4,533,959 | 8/1985 | Sakurai | 358/280 |
| 4,741,045 | 4/1988 | Denning | 382/9 |
| 4,748,678 | 5/1988 | Takeda et al. | 382/56 |
| 4,933,984 | 6/1990 | Nakano et al. | 382/61 |
| 4,949,392 | 8/1990 | Barski et al. | 382/61 |
| 5,048,112 | 9/1991 | Alves et al. | 382/56 |
| 5,123,061 | 6/1992 | Pritchard | 382/56 |
| 5,140,650 | 8/1992 | Casey et al. | 382/61 |
| 5,199,081 | 3/1993 | Saito et al. | 382/61 |
| 5,317,646 | 5/1994 | Sang, Jr. et al. | 382/282 |
| 5,428,694 | 6/1995 | Betts et al. | 382/317 |

OTHER PUBLICATIONS

IBM Technical Disclosure Bulletin, H. Aghili, et al., "Converting Paper Document to Electronic Images With Automatic Document . . .", vol. 34, Mar. 1992; pp. 435–439.

*Primary Examiner*—Yon J. Couso
*Attorney, Agent, or Firm*—John E. Hoel; Andrew J. Dillon

[57] ABSTRACT

The pixel count value in each cell of an array of cells located on a set master forms. Each completed form is scanned into a data processing system and the scanned image is compressed and buffered. In accordance with the invention, when the compressed, completed form is ready to be analyzed, only its top part needs to be decompressed. A form signature set is prepared for the decompressed part of the completed form in the same manner as the master signature set was prepared. The first N rows of the form need to be decompressed and a form signature set created from a pixel count value on each cell of an array of cells located in the decompressed portion of the completed form. The form signature set is compared to the master signature set to determine the best match.

12 Claims, 40 Drawing Sheets

VALUES OF MASTER_A SIGNATURE SET 104A
FOR MASTER_A BIT MAP IMAGE 110A

FORM 100A
GRID 102

| MA(1,1)=0 | MA(1,2)=0 | MA(1,3)=0 | MA(1,4)=0 | MA(1,5)=0 | MA(1,6)=0 | MA(1,7)=0 | MA(1,8)=0 |
|---|---|---|---|---|---|---|---|
| MA(2,1)=2 | MA(2,2)=3 | MA(2,3)=2 | MA(2,4)=3 | MA(2,5)=0 | MA(2,6)=0 | MA(2,7)=0 | MA(2,8)=0 |
| MA(3,1)=1 | MA(3,2)=2 | MA(3,3)=2 | MA(3,4)=2 | MA(3,5)=0 | MA(3,6)=0 | MA(3,7)=0 | MA(3,8)=0 |
| MA(4,1)=1 | MA(4,2)=2 | MA(4,3)=5 | MA(4,4)=2 | MA(4,5)=0 | MA(4,6)=0 | MA(4,7)=0 | MA(4,8)=0 |
| MA(5,1)=3 | MA(5,2)=3 | MA(5,3)=1 | MA(5,4)=3 | MA(5,5)=0 | MA(5,6)=0 | MA(5,7)=0 | MA(5,8)=0 |
| MA(6,1)=0 | MA(6,2)=0 | MA(6,3)=0 | MA(6,4)=0 | MA(6,5)=0 | MA(6,6)=0 | MA(6,7)=0 | MA(6,8)=0 |
| MA(7,1)=0 | MA(7,2)=0 | MA(7,3)=0 | MA(7,4)=0 | MA(7,5)=0 | MA(7,6)=0 | MA(7,7)=0 | MA(7,8)=0 |
| MA(8,1)=7 | MA(8,2)=7 | MA(8,3)=7 | MA(8,4)=7 | MA(8,5)=7 | MA(8,6)=7 | MA(8,7)=7 | MA(8,8)=7 |

DECOMPRESSED IMAGE PORTION 108

COMPRESSED IMAGE PORTION 108'

*Fig. 3D*

| MB(1,1) | MB(1,2) | MB(1,3) | MB(1,4) | MB(1,5) | MB(1,6) | MB(1,7) | MB(1,8) |
|---|---|---|---|---|---|---|---|
| MB(2,1) | MB(2,2) | MB(2,3) | MB(2,4) | MB(2,5) | MB(2,6) | MB(2,7) | MB(2,8) |
| MB(3,1) | MB(3,2) | MB(3,3) | MB(3,4) | MB(3,5) | MB(3,6) | MB(3,7) | MB(3,8) |
| MB(4,1) | MB(4,2) | MB(4,3) | MB(4,4) | MB(4,5) | MB(4,6) | MB(4,7) | MB(4,8) |
| MB(5,1) | MB(5,2) | MB(5,3) | MB(5,4) | MB(5,5) | MB(5,6) | MB(5,7) | MB(5,8) |
| MB(6,1) | MB(6,2) | MB(6,3) | MB(6,4) | MB(6,5) | MB(6,6) | MB(6,7) | MB(6,8) |
| MB(7,1) | MB(7,2) | MB(7,3) | MB(7,4) | MB(7,5) | MB(7,6) | MB(7,7) | MB(7,8) |
| MB(8,1) | MB(8,2) | MB(8,3) | MB(8,4) | MB(8,5) | MB(8,6) | MB(8,7) | MB(8,8) |

FORM 100B
GRID 102
MASTER_B SIGNATURE SET 104B
BLACK PIXEL MATRIX 105B
DECOMPRESSED IMAGE PORTION 108
COMPRESSED IMAGE PORTION 108'

Fig. 3E

VALUES OF MASTER_B SIGNATURE SET 104B
FOR MASTER_B BIT MAP IMAGE 110B

FORM 100B
GRID 102

| MB(1,1) = 7 | MB(1,2) = 7 | MB(1,3) = 7 | MB(1,4) = 7 | MB(1,5) = 7 | MB(1,6) = 7 | MB(1,7) = 7 | MB(1,8) = 7 |
|---|---|---|---|---|---|---|---|
| MB(2,1) = 0 | MB(2,2) = 0 | MB(2,3) = 0 | MB(2,4) = 0 | MB(2,5) = 0 | MB(2,6) = 0 | MB(2,7) = 0 | MB(2,8) = 0 |
| MB(3,1) = 0 | MB(3,2) = 0 | MB(3,3) = 0 | MB(3,4) = 0 | MB(3,5) = 0 | MB(3,6) = 0 | MB(3,7) = 0 | MB(3,8) = 0 |
| MB(4,1) = 0 | MB(4,2) = 0 | MB(4,3) = 0 | MB(4,4) = 0 | MB(4,5) = 0 | MB(4,6) = 0 | MB(4,7) = 0 | MB(4,8) = 0 |
| MB(5,1) = 0 | MB(5,2) = 0 | MB(5,3) = 2 | MB(5,4) = 3 | MB(5,5) = 2 | MB(5,6) = 3 | MB(5,7) = 5 | MB(5,8) = 5 |
| MB(6,1) = 0 | MB(6,2) = 0 | MB(6,3) = 1 | MB(6,4) = 2 | MB(6,5) = 2 | MB(6,6) = 2 | MB(6,7) = 3 | MB(6,8) = 1 |
| MB(7,1) = 0 | MB(7,2) = 0 | MB(7,3) = 1 | MB(7,4) = 2 | MB(7,5) = 5 | MB(7,6) = 2 | MB(7,7) = 1 | MB(7,8) = 1 |
| MB(8,1) = 0 | MB(8,2) = 0 | MB(8,3) = 3 | MB(8,4) = 3 | MB(8,5) = 1 | MB(8,6) = 3 | MB(8,7) = 5 | MB(8,8) = 5 |

DECOMPRESSED IMAGE PORTION 108
- - - - - - - - - - - - - - - - - - - - - - - - - - - - - - - - - - - - - - -
COMPRESSED IMAGE PORTION 108'

*Fig. 3G*

|          |          |          |          |          |          |          |          |
|----------|----------|----------|----------|----------|----------|----------|----------|
| MC(1,1)  | MC(1,2)  | MC(1,3)  | MC(1,4)  | MC(1,5)  | MC(1,6)  | MC(1,7)  | MC(1,8)  |
| MC(2,1)  | MC(2,2)  | MC(2,3)  | MC(2,4)  | MC(2,5)  | MC(2,6)  | MC(2,7)  | MC(2,8)  |
| MC(3,1)  | MC(3,2)  | MC(3,3)  | MC(3,4)  | MC(3,5)  | MC(3,6)  | MC(3,7)  | MC(3,8)  |
| MC(4,1)  | MC(4,2)  | MC(4,3)  | MC(4,4)  | MC(4,5)  | MC(4,6)  | MC(4,7)  | MC(4,8)  |
| MC(5,1)  | MC(5,2)  | MC(5,3)  | MC(5,4)  | MC(5,5)  | MC(5,6)  | MC(5,7)  | MC(5,8)  |
| MC(6,1)  | MC(6,2)  | MC(6,3)  | MC(6,4)  | MC(6,5)  | MC(6,6)  | MC(6,7)  | MC(6,8)  |
| MC(7,1)  | MC(7,2)  | MC(7,3)  | MC(7,4)  | MC(7,5)  | MC(7,6)  | MC(7,7)  | MC(7,8)  |
| MC(8,1)  | MC(8,2)  | MC(8,3)  | MC(8,4)  | MC(8,5)  | MC(8,6)  | MC(8,7)  | MC(8,8)  |

BLACK PIXEL MATRIX 105C

MASTER_C SIGNATURE SET 104C

GRID 102

FORM 100C

DECOMPRESSED IMAGE PORTION 108

COMPRESSED IMAGE PORTION 108'

*Fig. 3H*

VALUES OF MASTER_C SIGNATURE SET 104C
FOR MASTER_C BIT MAP IMAGE 110C

FORM 100C
GRID 102

| MC(1,1) = 0 | MC(1,2) = 0 | MC(1,3) = 2 | MC(1,4) = 3 | MC(1,5) = 2 | MC(1,6) = 3 | MC(1,7) = 1 | MC(1,8) = 0 |
|---|---|---|---|---|---|---|---|
| MC(2,1) = 0 | MC(2,2) = 0 | MC(2,3) = 1 | MC(2,4) = 2 | MC(2,5) = 2 | MC(2,6) = 2 | MC(2,7) = 2 | MC(2,8) = 0 |
| MC(3,1) = 0 | MC(3,2) = 0 | MC(3,3) = 1 | MC(3,4) = 2 | MC(3,5) = 5 | MC(3,6) = 2 | MC(3,7) = 5 | MC(3,8) = 0 |
| MC(4,1) = 0 | MC(4,2) = 0 | MC(4,3) = 3 | MC(4,4) = 3 | MC(4,5) = 1 | MC(4,6) = 3 | MC(4,7) = 2 | MC(4,8) = 0 |
| MC(5,1) = 6 | MC(5,2) = 6 | MC(5,3) = 0 | MC(5,4) = 0 | MC(5,5) = 0 | MC(5,6) = 0 | MC(5,7) = 0 | MC(5,8) = 0 |
| MC(6,1) = 1 | MC(6,2) = 1 | MC(6,3) = 0 | MC(6,4) = 0 | MC(6,5) = 0 | MC(6,6) = 0 | MC(6,7) = 0 | MC(6,8) = 0 |
| MC(7,1) = 1 | MC(7,2) = 1 | MC(7,3) = 0 | MC(7,4) = 0 | MC(7,5) = 0 | MC(7,6) = 0 | MC(7,7) = 0 | MC(7,8) = 0 |
| MC(8,1) = 6 | MC(8,2) = 6 | MC(8,3) = 0 | MC(8,4) = 0 | MC(8,5) = 0 | MC(8,6) = 0 | MC(8,7) = 0 | MC(8,8) = 0 |

DECOMPRESSED IMAGE PORTION 108
- - - - - - - - - - - - - - - - - - - - - - - -
COMPRESSED IMAGE PORTION 108'

*Fig. 3J*

SQUARE OF
VALUES OF MASTER_A SIGNATURE SET 104A   115A        FORM 100A
FOR MASTER_A BIT MAP IMAGE 110A                    GRID 102
                                                TOTAL XA = 493

| XA(1,1)=0 | XA(1,2)=0 | XA(1,3)=0 | XA(1,4)=0 | XA(1,5)=0 | XA(1,6)=0 | XA(1,7)=0 | XA(1,8)=0 |
|---|---|---|---|---|---|---|---|
| XA(2,1)=4 | XA(2,2)=9 | XA(2,3)=4 | XA(2,4)=9 | XA(2,5)=0 | XA(2,6)=0 | XA(2,7)=0 | XA(2,8)=0 |
| XA(3,1)=1 | XA(3,2)=4 | XA(3,3)=4 | XA(3,4)=4 | XA(3,5)=0 | XA(3,6)=0 | XA(3,7)=0 | XA(3,8)=0 |
| XA(4,1)=1 | XA(4,2)=4 | XA(4,3)=25 | XA(4,4)=4 | XA(4,5)=0 | XA(4,6)=0 | XA(4,7)=0 | XA(4,8)=0 |
| XA(5,1)=9 | XA(5,2)=9 | XA(5,3)=1 | XA(5,4)=9 | XA(5,5)=0 | XA(5,6)=0 | XA(5,7)=0 | XA(5,8)=0 |
| XA(6,1)=0 | XA(6,2)=0 | XA(6,3)=0 | XA(6,4)=0 | XA(6,5)=0 | XA(6,6)=0 | XA(6,7)=0 | XA(6,8)=0 |
| XA(7,1)=0 | XA(7,2)=0 | XA(7,3)=0 | XA(7,4)=0 | XA(7,5)=0 | XA(7,6)=0 | XA(7,7)=0 | XA(7,8)=0 |
| XA(8,1)=49 | XA(8,2)=49 | XA(8,3)=49 | XA(8,4)=49 | XA(8,5)=49 | XA(8,6)=49 | XA(8,7)=49 | XA(8,8)=49 |

DECOMPRESSED IMAGE PORTION  108
- - - - - - - - - - - - - - - - - - - - - - - - - - - - - - - - - -
COMPRESSED IMAGE PORTION  108'

*Fig. 3K*

SQUARE OF
VALUES OF MASTER_B SIGNATURE SET 104B  115B      FORM 100B
FOR MASTER_B BIT MAP IMAGE 110B                  GRID 102
                                     TOTAL XB = 605

| XB(1,1)<br>= 49 | XB(1,2)<br>= 49 | XB(1,3)<br>= 49 | XB(1,4)<br>= 49 | XB(1,5)<br>= 49 | XB(1,6)<br>= 49 | XB(1,7)<br>= 49 | XB(1,8)<br>= 49 |
|---|---|---|---|---|---|---|---|
| XB(2,1)<br>= 0 | XB(2,2)<br>= 0 | XB(2,3)<br>= 0 | XB(2,4)<br>= 0 | XB(2,5)<br>= 0 | XB(2,6)<br>= 0 | XB(2,7)<br>= 0 | XB(2,8)<br>= 0 |
| XB(3,1)<br>= 0 | XB(3,2)<br>= 0 | XB(3,3)<br>= 0 | XB(3,4)<br>= 0 | XB(3,5)<br>= 0 | XB(3,6)<br>= 0 | XB(3,7)<br>= 0 | XB(3,8)<br>= 0 |
| XB(4,1)<br>= 0 | XB(4,2)<br>= 0 | XB(4,3)<br>= 0 | XB(4,4)<br>= 0 | XB(4,5)<br>= 0 | XB(4,6)<br>= 0 | XB(4,7)<br>= 0 | XB(4,8)<br>= 0 |
| XB(5,1)<br>= 0 | XB(5,2)<br>= 0 | XB(5,3)<br>= 4 | XB(5,4)<br>= 9 | XB(5,5)<br>= 4 | XB(5,6)<br>= 9 | XB(5,7)<br>= 25 | XB(5,8)<br>= 25 |
| XB(6,1)<br>= 0 | XB(6,2)<br>= 0 | XB(6,3)<br>= 1 | XB(6,4)<br>= 4 | XB(6,5)<br>= 4 | XB(6,6)<br>= 4 | XB(6,7)<br>= 9 | XB(6,8)<br>= 1 |
| XB(7,1)<br>= 0 | XB(7,2)<br>= 0 | XB(7,3)<br>= 1 | XB(7,4)<br>= 4 | XB(7,5)<br>= 25 | XB(7,6)<br>= 4 | XB(7,7)<br>= 1 | XB(7,8)<br>= 1 |
| XB(8,1)<br>= 0 | XB(8,2)<br>= 0 | XB(8,3)<br>= 9 | XB(8,4)<br>= 9 | XB(8,5)<br>= 1 | XB(8,6)<br>= 9 | XB(8,7)<br>= 25 | XB(8,8)<br>= 25 |

DECOMPRESSED IMAGE PORTION  108
- - - - - - - - - - - - - - - - - - - - - - - - - - - -
COMPRESSED IMAGE PORTION  108'

*Fig. 3L*

SQUARE OF
VALUES OF MASTER_C SIGNATURE SET 104C  ⌒115C    FORM 100C ⌝
FOR MASTER_C BIT MAP IMAGE 110C              GRID 102 ⌝
                                    ↙ TOTAL XC = 283

| XC(1,1)=0  | XC(1,2)=0  | XC(1,3)=4 | XC(1,4)=9 | XC(1,5)=4  | XC(1,6)=9 | XC(1,7)=1 | XC(1,8)=0 |
|------------|------------|-----------|-----------|------------|-----------|-----------|-----------|
| XC(2,1)=0  | XC(2,2)=0  | XC(2,3)=1 | XC(2,4)=4 | XC(2,5)=4  | XC(2,6)=4 | XC(2,7)=4 | XC(2,8)=0 |
| XC(3,1)=0  | XC(3,2)=0  | XC(3,3)=1 | XC(3,4)=4 | XC(3,5)=25 | XC(3,6)=4 | XC(3,7)=25| XC(3,8)=0 |
| XC(4,1)=0  | XC(4,2)=0  | XC(4,3)=9 | XC(4,4)=9 | XC(4,5)=1  | XC(4,6)=9 | XC(4,7)=4 | XC(4,8)=0 |
| XC(5,1)=36 | XC(5,2)=36 | XC(5,3)=0 | XC(5,4)=0 | XC(5,5)=0  | XC(5,6)=0 | XC(5,7)=0 | XC(5,8)=0 |
| XC(6,1)=1  | XC(6,2)=1  | XC(6,3)=0 | XC(6,4)=0 | XC(6,5)=0  | XC(6,6)=0 | XC(6,7)=0 | XC(6,8)=0 |
| XC(7,1)=1  | XC(7,2)=1  | XC(7,3)=0 | XC(7,4)=0 | XC(7,5)=0  | XC(7,6)=0 | XC(7,7)=0 | XC(7,8)=0 |
| XC(8,1)=36 | XC(8,2)=36 | XC(8,3)=0 | XC(8,4)=0 | XC(8,5)=0  | XC(8,6)=0 | XC(8,7)=0 | XC(8,8)=0 |

DECOMPRESSED IMAGE PORTION 108
---
COMPRESSED IMAGE PORTION 108'

*Fig. 3M*

| F1(1,1) | F1(1,2) | F1(1,3) | F1(1,4) | F1(1,5) | F1(1,6) | F1(1,7) | F1(1,8) |
|---------|---------|---------|---------|---------|---------|---------|---------|
| F1(2,1) | F1(2,2) | F1(2,3) | F1(2,4) | F1(2,5) | F1(2,6) | F1(2,7) | F1(2,8) |
| F1(3,1) | F1(3,2) | F1(3,3) | F1(3,4) | F1(3,5) | F1(3,6) | F1(3,7) | F1(3,8) |
| F1(4,1) | F1(4,2) | F1(4,3) | F1(4,4) | F1(4,5) | F1(4,6) | F1(4,7) | F1(4,8) |
| F1(5,1) | F1(5,2) | F1(5,3) | F1(5,4) | F1(5,5) | F1(5,6) | F1(5,7) | F1(5,8) |
| F1(6,1) | F1(6,2) | F1(6,3) | F1(6,4) | F1(6,5) | F1(6,6) | F1(6,7) | F1(6,8) |
| F1(7,1) | F1(7,2) | F1(7,3) | F1(7,4) | F1(7,5) | F1(7,6) | F1(7,7) | F1(7,8) |
| F1(8,1) | F1(8,2) | F1(8,3) | F1(8,4) | F1(8,5) | F1(8,6) | F1(8,7) | F1(8,8) |

BLACK PIXEL MATRIX 105(1)

FORM_1 SIGNATURE SET 106(1)

GRID 102

DECOMPRESSED IMAGE PORTION 108

COMPRESSED IMAGE PORTION 108'

Fig. 4A

VALUES OF FORM_1 SIGNATURE SET 106(1)
FOR FORM_1 BIT MAP IMAGE 112(1)

GRID 102

| F1(1,1)<br>= 0 | F1(1,2)<br>= 0 | F1(1,3)<br>= 2 | F1(1,4)<br>= 3 | F1(1,5)<br>= 2 | F1(1,6)<br>= 3 | F1(1,7)<br>= 1 | F1(1,8)<br>= 0 |
|---|---|---|---|---|---|---|---|
| F1(2,1)<br>= 0 | F1(2,2)<br>= 0 | F1(2,3)<br>= 1 | F1(2,4)<br>= 2 | F1(2,5)<br>= 2 | F1(2,6)<br>= 2 | F1(2,7)<br>= 2 | F1(2,8)<br>= 0 |
| F1(3,1)<br>= 0 | F1(3,2)<br>= 0 | F1(3,3)<br>= 1 | F1(3,4)<br>= 2 | F1(3,5)<br>= 5 | F1(3,6)<br>= 2 | F1(3,7)<br>= 5 | F1(3,8)<br>= 0 |
| F1(4,1)<br>= 0 | F1(4,2)<br>= 0 | F1(4,3)<br>= 3 | F1(4,4)<br>= 3 | F1(4,5)<br>= 1 | F1(4,6)<br>= 3 | F1(4,7)<br>= 2 | F1(4,8)<br>= 0 |
| F1(5,1)<br>= 6 | F1(5,2)<br>= 6 | F1(5,3)<br>= 0 | F1(5,4)<br>= 0 | F1(5,5)<br>= 0 | F1(5,6)<br>= 0 | F1(5,7)<br>= 0 | F1(5,8)<br>= 0 |
| F1(6,1)<br>= 1 | F1(6,2)<br>= 3<br>XX | F1(6,3)<br>= 0 | F1(6,4)<br>= 0 | F1(6,5)<br>= 0 | F1(6,6)<br>= 0 | F1(6,7)<br>= 0 | F1(6,8)<br>= 0 |
| F1(7,1)<br>= 1 | F1(7,2)<br>= 3<br>XX | F1(7,3)<br>= 0 | F1(7,4)<br>= 0 | F1(7,5)<br>= 0 | F1(7,6)<br>= 0 | F1(7,7)<br>= 0 | F1(7,8)<br>= 0 |
| F1(8,1)<br>= 6 | F1(8,2)<br>= 6 | F1(8,3)<br>= 0 | F1(8,4)<br>= 0 | F1(8,5)<br>= 0 | F1(8,6)<br>= 0 | F1(8,7)<br>= 0 | F1(8,8)<br>= 0 |

DECOMPRESSED IMAGE PORTION   108

- - - - - - - - - - - - - - - - - - - - - - - - - - - - - -

COMPRESSED IMAGE PORTION   108'

| F2(1,1) | F2(1,2) | F2(1,3) | F2(1,4) | F2(1,5) | F2(1,6) | F2(1,7) | F2(1,8) |
|---------|---------|---------|---------|---------|---------|---------|---------|
| F2(2,1) | F2(2,2) | F2(2,3) | F2(2,4) | F2(2,5) | F2(2,6) | F2(2,7) | F2(2,8) |
| F2(3,1) | F2(3,2) | F2(3,3) | F2(3,4) | F2(3,5) | F2(3,6) | F2(3,7) | F2(3,8) |
| F2(4,1) | F2(4,2) | F2(4,3) | F2(4,4) | F2(4,5) | F2(4,6) | F2(4,7) | F2(4,8) |
| F2(5,1) | F2(5,2) | F2(5,3) | F2(5,4) | F2(5,5) | F2(5,6) | F2(5,7) | F2(5,8) |
| F2(6,1) | F2(6,2) | F2(6,3) | F2(6,4) | F2(6,5) | F2(6,6) | F2(6,7) | F2(6,8) |
| F2(7,1) | F2(7,2) | F2(7,3) | F2(7,4) | F2(7,5) | F2(7,6) | F2(7,7) | F2(7,8) |
| F2(8,1) | F2(8,2) | F2(8,3) | F2(8,4) | F2(8,5) | F2(8,6) | F2(8,7) | F2(8,8) |

BLACK PIXEL MATRIX 105(2)
FORM_2 SIGNATURE SET 106(2)
GRID 102
DECOMPRESSED IMAGE PORTION 108
COMPRESSED IMAGE PORTION 108'

VALUES OF FORM_2 SIGNATURE SET 106(2)
FOR FORM_2 BIT MAP IMAGE 112(2)

GRID 102

| F2(1,1)<br>= 0 | F2(1,2)<br>= 0 | F2(1,3)<br>= 2 | F2(1,4)<br>= 3 | F2(1,5)<br>= 2 | F2(1,6)<br>= 3 | F2(1,7)<br>= 1 | F2(1,8)<br>= 0 |
|---|---|---|---|---|---|---|---|
| F2(2,1)<br>= 0 | F2(2,2)<br>= 0 | F2(2,3)<br>= 1 | F2(2,4)<br>= 2 | F2(2,5)<br>= 2 | F2(2,6)<br>= 2 | F2(2,7)<br>= 2 | F2(2,8)<br>= 0 |
| F2(3,1)<br>= 0 | F2(3,2)<br>= 0 | F2(3,3)<br>= 1 | F2(3,4)<br>= 2 | F2(3,5)<br>= 5 | F2(3,6)<br>= 2 | F2(3,7)<br>= 5 | F2(3,8)<br>= 0 |
| F2(4,1)<br>= 0 | F2(4,2)<br>= 0 | F2(4,3)<br>= 3 | F2(4,4)<br>= 3 | F2(4,5)<br>= 1 | F2(4,6)<br>= 3 | F2(4,7)<br>= 2 | F2(4,8)<br>= 0 |
| F2(5,1)<br>= 6 | F2(5,2)<br>= 6 | F2(5,3)<br>= 0 | F2(5,4)<br>= 0 | F2(5,5)<br>= 0 | F2(5,6)<br>= 0 | F2(5,7)<br>= 0 | F2(5,8)<br>= 0 |
| F2(6,1)<br>= 4<br>XXX | F2(6,2)<br>= 1 | F2(6,3)<br>= 0 | F2(6,4)<br>= 0 | F2(6,5)<br>= 0 | F2(6,6)<br>= 0 | F2(6,7)<br>= 0 | F2(6,8)<br>= 0 |
| F2(7,1)<br>= 4<br>XXX | F2(7,2)<br>= 1 | F2(7,3)<br>= 0 | F2(7,4)<br>= 0 | F2(7,5)<br>= 0 | F2(7,6)<br>= 0 | F2(7,7)<br>= 0 | F2(7,8)<br>= 0 |
| F2(8,1)<br>= 6 | F2(8,2)<br>= 6 | F2(8,3)<br>= 0 | F2(8,4)<br>= 0 | F2(8,5)<br>= 0 | F2(8,6)<br>= 0 | F2(8,7)<br>= 0 | F2(8,8)<br>= 0 |

DECOMPRESSED IMAGE PORTION 108
- - - - - - - - - - - - - - - - - - - - - - - - - - - -
COMPRESSED IMAGE PORTION 108'

VALUES OF FORM_3 SIGNATURE SET 106(3)
FOR FORM_3 BIT MAP IMAGE 112(3)

GRID 102

| F3(1,1) = 0 | F3(1,2) = 0 | F3(1,3) = 2 | F3(1,4) = 3 | F3(1,5) = 2 | F3(1,6) = 3 | F3(1,7) = 1 | F3(1,8) = 0 |
|---|---|---|---|---|---|---|---|
| F3(2,1) = 0 | F3(2,2) = 0 | F3(2,3) = 1 | F3(2,4) = 2 | F3(2,5) = 2 | F3(2,6) = 2 | F3(2,7) = 2 | F3(2,8) = 0 |
| F3(3,1) = 0 | F3(3,2) = 0 | F3(3,3) = 1 | F3(3,4) = 2 | F3(3,5) = 5 | F3(3,6) = 2 | F3(3,7) = 5 | F3(3,8) = 0 |
| F3(4,1) = 0 | F3(4,2) = 0 | F3(4,3) = 3 | F3(4,4) = 3 | F3(4,5) = 1 | F3(4,6) = 3 | F3(4,7) = 2 | F3(4,8) = 0 |
| F3(5,1) = 6 | F3(5,2) = 6 | F3(5,3) = 0 | F3(5,4) = 0 | F3(5,5) = 0 | F3(5,6) = 0 | F3(5,7) = 0 | F3(5,8) = 0 |
| F3(6,1) = 5 XXXX | F3(6,2) = 5 XXXX | F3(6,3) = 0 | F3(6,4) = 0 | F3(6,5) = 0 | F3(6,6) = 0 | F3(6,7) = 0 | F3(6,8) = 0 |
| F3(7,1) = 5 XXXX | F3(7,2) = 5 XXXX | F3(7,3) = 0 | F3(7,4) = 0 | F3(7,5) = 0 | F3(7,6) = 0 | F3(7,7) = 0 | F3(7,8) = 0 |
| F3(8,1) = 6 | F3(8,2) = 6 | F3(8,3) = 0 | F3(8,4) = 0 | F3(8,5) = 0 | F3(8,6) = 0 | F3(8,7) = 0 | F3(8,8) = 0 |

DECOMPRESSED IMAGE PORTION 108

COMPRESSED IMAGE PORTION 108'

*Fig. 41*

DIFFERENCE VALUES BETWEEN
VALUES OF MASTER_A SIGNATURE SET 104A AND  120A   FORM 100A
VALUES OF FORM_1 SIGNATURE SET 106(1)              GRID 102

| DA(1,1) = 0 | DA(1,2) = 0 | DA(1,3) = -2 | DA(1,4) = -3 | DA(1,5) = -2 | DA(1,6) = -3 | DA(1,7) = -1 | DA(1,8) = 0 |
|---|---|---|---|---|---|---|---|
| DA(2,1) = 2 | DA(2,2) = 3 | DA(2,3) = 1 | DA(2,4) = 1 | DA(2,5) = -2 | DA(2,6) = -2 | DA(2,7) = -2 | DA(2,8) = 0 |
| DA(3,1) = 1 | DA(3,2) = 2 | DA(3,3) = 1 | DA(3,4) = 0 | DA(3,5) = -5 | DA(3,6) = -2 | DA(3,7) = -5 | DA(3,8) = 0 |
| DA(4,1) = 1 | DA(4,2) = 2 | DA(4,3) = 2 | DA(4,4) = -1 | DA(4,5) = -1 | DA(4,6) = -3 | DA(4,7) = -2 | DA(4,8) = 0 |
| DA(5,1) = -3 | DA(5,2) = -3 | DA(5,3) = 1 | DA(5,4) = 3 | DA(5,5) = 0 | DA(5,6) = 0 | DA(5,7) = 0 | DA(5,8) = 0 |
| DA(6,1) = -1 | DA(6,2) = -3 | DA(6,3) = 0 | DA(6,4) = 0 | DA(6,5) = 0 | DA(6,6) = 0 | DA(6,7) = 0 | DA(6,8) = 0 |
| DA(7,1) = -1 | DA(7,2) = -3 | DA(7,3) = 0 | DA(7,4) = 0 | DA(7,5) = 0 | DA(7,6) = 0 | DA(7,7) = 0 | DA(7,8) = 0 |
| DA(8,1) = 1 | DA(8,2) = 1 | DA(8,3) = 7 | DA(8,4) = 7 | DA(8,5) = 7 | DA(8,6) = 7 | DA(8,7) = 7 | DA(8,8) = 7 |

DECOMPRESSED IMAGE PORTION 108
- - - - - - - - - - - - - - - - - - - - - - - - - - - - - - - - - - - -
COMPRESSED IMAGE PORTION 108'

*Fig. 5A*

DIFFERENCE VALUES BETWEEN
VALUES OF MASTER_B SIGNATURE SET 104B AND  120B  FORM 100B
VALUES OF FORM_1 SIGNATURE SET 106(1)        GRID 102

| DB(1,1)=7 | DB(1,2)=7 | DB(1,3)=5 | DB(1,4)=4 | DB(1,5)=5 | DB(1,6)=4 | DB(1,7)=6 | DB(1,8)=7 |
|---|---|---|---|---|---|---|---|
| DB(2,1)=0 | DB(2,2)=0 | DB(2,3)=-1 | DB(2,4)=-2 | DB(2,5)=-2 | DB(2,6)=-2 | DB(2,7)=-2 | DB(2,8)=0 |
| DB(3,1)=0 | DB(3,2)=0 | DB(3,3)=-1 | DB(3,4)=-2 | DB(3,5)=-5 | DB(3,6)=-2 | DB(3,7)=-5 | DB(3,8)=0 |
| DB(4,1)=0 | DB(4,2)=0 | DB(4,3)=-3 | DB(4,4)=-3 | DB(4,5)=-1 | DB(4,6)=-3 | DB(4,7)=-2 | DB(4,8)=0 |
| DB(5,1)=-6 | DB(5,2)=-6 | DB(5,3)=2 | DB(5,4)=3 | DB(5,5)=2 | DB(5,6)=3 | DB(5,7)=5 | DB(5,8)=5 |
| DB(6,1)=-1 | DB(6,2)=-3 | DB(6,3)=1 | DB(6,4)=2 | DB(6,5)=2 | DB(6,6)=2 | DB(6,7)=3 | DB(6,8)=1 |
| DB(7,1)=-1 | DB(7,2)=-3 | DB(7,3)=1 | DA(7,4)=2 | DB(7,5)=5 | DB(7,6)=2 | DB(7,7)=1 | DB(7,8)=1 |
| DB(8,1)=-6 | DB(8,2)=-6 | DB(8,3)=3 | DB(8,4)=3 | DB(8,5)=1 | DB(8,6)=3 | DB(8,7)=5 | DB(8,8)=5 |

DECOMPRESSED IMAGE PORTION 108
- - - - - - - - - - - - - - - - - - - - - - - - - - - -
COMPRESSED IMAGE PORTION 108'

Fig. 5B

DIFFERENCE VALUES BETWEEN
VALUES OF MASTER_C SIGNATURE SET 104C AND
VALUES OF FORM_1 SIGNATURE SET 106(1)

120C    FORM 100C
        GRID 102

| DC(1,1) = 0 | DC(1,2) = 0 | DC(1,3) = 0 | DC(1,4) = 0 | DC(1,5) = 0 | DC(1,6) = 0 | DC(1,7) = 0 | DC(1,8) = 0 |
|---|---|---|---|---|---|---|---|
| DC(2,1) = 0 | DC(2,2) = 0 | DC(2,3) = 0 | DC(2,4) = 0 | DC(2,5) = 0 | DC(2,6) = 0 | DC(2,7) = 0 | DC(2,8) = 0 |
| DC(3,1) = 0 | DC(3,2) = 0 | DC(3,3) = 0 | DC(3,4) = 0 | DC(3,5) = 0 | DC(3,6) = 0 | DC(3,7) = 0 | DC(3,8) = 0 |
| DC(4,1) = 0 | DC(4,2) = 0 | DC(4,3) = 0 | DC(4,4) = 0 | DC(4,5) = 0 | DC(4,6) = 0 | DC(4,7) = 0 | DC(4,8) = 0 |
| DC(5,1) = 0 | DC(5,2) = 0 | DC(5,3) = 0 | DC(5,4) = 0 | DC(5,5) = 0 | DC(5,6) = 0 | DC(5,7) = 0 | DC(5,8) = 0 |
| DC(6,1) = 0 | DC(6,2) = -2 | DC(6,3) = 0 | DC(6,4) = 0 | DC(6,5) = 0 | DC(6,6) = 0 | DC(6,7) = 0 | DC(6,8) = 0 |
| DC(7,1) = 0 | DC(7,2) = -2 | DC(7,3) = 0 | DC(7,4) = 0 | DC(7,5) = 0 | DC(7,6) = 0 | DC(7,7) = 0 | DC(7,8) = 0 |
| DC(8,1) = 0 | DC(8,2) = 0 | DC(8,3) = 0 | DC(8,4) = 0 | DC(8,5) = 0 | DC(8,6) = 0 | DC(8,7) = 0 | DC(8,8) = 0 |

DECOMPRESSED IMAGE PORTION 108
- - - - - - - - - - - - - - - - - - - - - - - - - - - - -
COMPRESSED IMAGE PORTION 108'

*Fig. 5C*

SQUARE OF DIFFERENCE VALUES BETWEEN  130A    FORM 100A
VALUES OF MASTER_A SIGNATURE SET 104A AND       GRID 102
VALUES OF FORM_1 SIGNATURE SET 106(1)    TOTAL SA = 482

| SA(1,1)=0 | SA(1,2)=0 | SA(1,3)=4 | SA(1,4)=9 | SA(1,5)=4 | SA(1,6)=9 | SA(1,7)=1 | SA(1,8)=0 |
|---|---|---|---|---|---|---|---|
| SA(2,1)=4 | SA(2,2)=9 | SA(2,3)=1 | SA(2,4)=1 | SA(2,5)=4 | SA(2,6)=4 | SA(2,7)=4 | SA(2,8)=0 |
| SA(3,1)=1 | SA(3,2)=4 | SA(3,3)=1 | SA(3,4)=0 | SA(3,5)=25 | SA(3,6)=4 | SA(3,7)=25 | SA(3,8)=0 |
| SA(4,1)=1 | SA(4,2)=4 | SA(4,3)=4 | SA(4,4)=1 | SA(4,5)=1 | SA(4,6)=9 | SA(4,7)=4 | SA(4,8)=0 |
| SA(5,1)=9 | SA(5,2)=9 | SA(5,3)=1 | SA(5,4)=9 | SA(5,5)=0 | SA(5,6)=0 | SA(5,7)=0 | SA(5,8)=0 |
| SA(6,1)=1 | SA(6,2)=9 | SA(6,3)=0 | SA(6,4)=0 | SA(6,5)=0 | SA(6,6)=0 | SA(6,7)=0 | SA(6,8)=0 |
| SA(7,1)=1 | SA(7,2)=9 | SA(7,3)=0 | SA(7,4)=0 | SA(7,5)=0 | SA(7,6)=0 | SA(7,7)=0 | SA(7,8)=0 |
| SA(8,1)=1 | SA(8,2)=1 | SA(8,3)=49 | SA(8,4)=49 | SA(8,5)=49 | SA(8,6)=49 | SA(8,7)=49 | SA(8,8)=49 |

DECOMPRESSED IMAGE PORTION 108

COMPRESSED IMAGE PORTION 108'

*Fig. 6A*

SQUARE OF DIFFERENCE VALUES BETWEEN
VALUES OF MASTER_B SIGNATURE SET 104B AND
VALUES OF FORM_1 SIGNATURE SET 106(1)

130B　　　FORM 100B
GRID 102
TOTAL SB = 760

| SB(1,1)=49 | SB(1,2)=49 | SB(1,3)=25 | SB(1,4)=16 | SB(1,5)=25 | SB(1,6)=16 | SB(1,7)=36 | SB(1,8)=49 |
|---|---|---|---|---|---|---|---|
| SB(2,1)=0 | SB(2,2)=0 | SB(2,3)=1 | SB(2,4)=4 | SB(2,5)=4 | SB(2,6)=4 | SB(2,7)=4 | SB(2,8)=0 |
| SB(3,1)=0 | SB(3,2)=0 | SB(3,3)=1 | SB(3,4)=4 | SB(3,5)=25 | SB(3,6)=4 | SB(3,7)=25 | SB(3,8)=0 |
| SB(4,1)=0 | SB(4,2)=0 | SB(4,3)=9 | SB(4,4)=9 | SB(4,5)=1 | SB(4,6)=9 | SB(4,7)=4 | SB(4,8)=0 |
| SB(5,1)=36 | SB(5,2)=36 | SB(5,3)=4 | SB(5,4)=9 | SB(5,5)=4 | SB(5,6)=9 | SB(5,7)=25 | SB(5,8)=25 |
| SB(6,1)=1 | SB(6,2)=9 | SB(6,3)=1 | SB(6,4)=4 | SB(6,5)=4 | SB(6,6)=4 | SB(6,7)=9 | SB(6,8)=1 |
| SB(7,1)=1 | SB(7,2)=9 | SB(7,3)=1 | SB(7,4)=4 | SB(7,5)=25 | SB(7,6)=4 | SB(7,7)=1 | SB(7,8)=1 |
| SB(8,1)=36 | SB(8,2)=36 | SB(8,3)=9 | SB(8,4)=9 | SB(8,5)=1 | SB(8,6)=9 | SB(8,7)=25 | SB(8,8)=25 |

DECOMPRESSED IMAGE PORTION 108
- - - - - - - - - - - - - - - - - - - - - - - - - - -
COMPRESSED IMAGE PORTION 108'

*Fig. 6B*

SQUARE OF DIFFERENCE VALUES BETWEEN
VALUES OF MASTER_C SIGNATURE SET 104C AND
VALUES OF FORM_1 SIGNATURE SET 106(1)

130C   FORM 100C
       GRID 102
TOTAL SC = 8

| SC(1,1)=0 | SC(1,2)=0 | SC(1,3)=0 | SC(1,4)=0 | SC(1,5)=0 | SC(1,6)=0 | SC(1,7)=0 | SC(1,8)=0 |
|---|---|---|---|---|---|---|---|
| SC(2,1)=0 | SC(2,2)=0 | SC(2,3)=0 | SC(2,4)=0 | SC(2,5)=0 | SC(2,6)=0 | SC(2,7)=0 | SC(2,8)=0 |
| SC(3,1)=0 | SC(3,2)=0 | SC(3,3)=0 | SC(3,4)=0 | SC(3,5)=0 | SC(3,6)=0 | SC(3,7)=0 | SC(3,8)=0 |
| SC(4,1)=0 | SC(4,2)=0 | SC(4,3)=0 | SC(4,4)=0 | SC(4,5)=0 | SC(4,6)=0 | SC(4,7)=0 | SC(4,8)=0 |
| SC(5,1)=0 | SC(5,2)=0 | SC(5,3)=0 | SC(5,4)=0 | SC(5,5)=0 | SC(5,6)=0 | SC(5,7)=0 | SC(5,8)=0 |
| SC(6,1)=0 | SC(6,2)=4 | SC(6,3)=0 | SC(6,4)=0 | SC(6,5)=0 | SC(6,6)=0 | SC(6,7)=0 | SC(6,8)=0 |
| SC(7,1)=0 | SC(7,2)=4 | SC(7,3)=0 | SC(7,4)=0 | SC(7,5)=0 | SC(7,6)=0 | SC(7,7)=0 | SC(7,8)=0 |
| SC(8,1)=0 | SC(8,2)=0 | SC(8,3)=0 | SC(8,4)=0 | SC(8,5)=0 | SC(8,6)=0 | SC(8,7)=0 | SC(8,8)=0 |

DECOMPRESSED IMAGE PORTION 108
- - - - - - - - - - - - - - - - - - - - - - - - - - - - - - - -
COMPRESSED IMAGE PORTION 108'

*Fig. 6C*

WEIGHTING VALUES FOR
MASTER_A SIGNATURE SET 104A                         140A            FORM 100A
                                                                 GRID 102

| WA(1,1)=1 | WA(1,2)=1 | WA(1,3)=1 | WA(1,4)=1 | WA(1,5)=1 | WA(1,6)=1 | WA(1,7)=1 | WA(1,8)=1 |
|---|---|---|---|---|---|---|---|
| WA(2,1)=1 | WA(2,2)=1 | WA(2,3)=1 | WA(2,4)=1 | WA(2,5)=1 | WA(2,6)=1 | WA(2,7)=1 | WA(2,8)=1 |
| WA(3,1)=1 | WA(3,2)=1 | WA(3,3)=1 | WA(3,4)=1 | WA(3,5)=1 | WA(3,6)=1 | WA(3,7)=1 | WA(3,8)=1 |
| WA(4,1)=1 | WA(4,2)=1 | WA(4,3)=1 | WA(4,4)=1 | WA(4,5)=1 | WA(4,6)=1 | WA(4,7)=1 | WA(4,8)=1 |
| WA(5,1)=1 | WA(5,2)=1 | WA(5,3)=1 | WA(5,4)=1 | WA(5,5)=1 | WA(5,6)=1 | WA(5,7)=1 | WA(5,8)=1 |
| WA(6,1)=1 | WA(6,2)=1 | WA(6,3)=1 | WA(6,4)=1 | WA(6,5)=1 | WA(6,6)=1 | WA(6,7)=1 | WA(6,8)=1 |
| WA(7,1)=1 | WA(7,2)=1 | WA(7,3)=1 | WA(7,4)=1 | WA(7,5)=1 | WA(7,6)=1 | WA(7,7)=1 | WA(7,8)=1 |
| WA(8,1)=1 | WA(8,2)=1 | WA(8,3)=1 | WA(8,4)=1 | WA(8,5)=1 | WA(8,6)=1 | WA(8,7)=1 | WA(8,8)=1 |

DECOMPRESSED IMAGE PORTION 108
--------
COMPRESSED IMAGE PORTION 108'

*Fig. 7A*

WEIGHTING VALUES FOR
MASTER_B SIGNATURE SET 104B         140B       FORM 100B
                                              GRID 102

| WB(1,1)=1 | WB(1,2)=1 | WB(1,3)=1 | WB(1,4)=1 | WB(1,5)=1 | WB(1,6)=1 | WB(1,7)=1 | WB(1,8)=1 |
|---|---|---|---|---|---|---|---|
| WB(2,1)=1 | WB(2,2)=1 | WB(2,3)=1 | WB(2,4)=1 | WB(2,5)=1 | WB(2,6)=1 | WB(2,7)=1 | WB(2,8)=1 |
| WB(3,1)=1 | WB(3,2)=1 | WB(3,3)=1 | WB(3,4)=1 | WB(3,5)=1 | WB(3,6)=1 | WB(3,7)=1 | WB(3,8)=1 |
| WB(4,1)=1 | WB(4,2)=1 | WB(4,3)=1 | WB(4,4)=1 | WB(4,5)=1 | WB(4,6)=1 | WB(4,7)=1 | WB(4,8)=1 |
| WB(5,1)=1 | WB(5,2)=1 | WB(5,3)=1 | WB(5,4)=1 | WB(5,5)=1 | WB(5,6)=1 | WB(5,7)=1 | WB(5,8)=1 |
| WB(6,1)=1 | WB(6,2)=1 | WB(6,3)=1 | WB(6,4)=1 | WB(6,5)=1 | WB(6,6)=1 | WB(6,7)=1 | WB(6,8)=1 |
| WB(7,1)=1 | WB(7,2)=1 | WB(7,3)=1 | WB(7,4)=1 | WB(7,5)=1 | WB(7,6)=1 | WB(7,7)=1 | WB(7,8)=1 |
| WB(8,1)=1 | WB(8,2)=1 | WB(8,3)=1 | WB(8,4)=1 | WB(8,5)=1 | WB(8,6)=1 | WB(8,7)=1 | WB(8,8)=1 |

DECOMPRESSED IMAGE PORTION 108
- - - - - - - - - - - - - - - - - - - - - - - - - - - - - - - -
COMPRESSED IMAGE PORTION 108'

*Fig. 7B*

WEIGHTING VALUES FOR
MASTER_C SIGNATURE SET 104C
BEFORE ADAPTIVE WEIGHTING STEP

140C  FORM 100C
GRID 102

| WC(1,1)=1 | WC(1,2)=1 | WC(1,3)=1 | WC(1,4)=1 | WC(1,5)=1 | WC(1,6)=1 | WC(1,7)=1 | WC(1,8)=1 |
|---|---|---|---|---|---|---|---|
| WC(2,1)=1 | WC(2,2)=1 | WC(2,3)=1 | WC(2,4)=1 | WC(2,5)=1 | WC(2,6)=1 | WC(2,7)=1 | WC(2,8)=1 |
| WC(3,1)=1 | WC(3,2)=1 | WC(3,3)=1 | WC(3,4)=1 | WC(3,5)=1 | WC(3,6)=1 | WC(3,7)=1 | WC(3,8)=1 |
| WC(4,1)=1 | WC(4,2)=1 | WC(4,3)=1 | WC(4,4)=1 | WC(4,5)=1 | WC(4,6)=1 | WC(4,7)=1 | WC(4,8)=1 |
| WC(5,1)=1 | WC(5,2)=1 | WC(5,3)=1 | WC(5,4)=1 | WC(5,5)=1 | WC(5,6)=1 | WC(5,7)=1 | WC(5,8)=1 |
| WC(6,1)=1 | WC(6,2)=1 | WC(6,3)=1 | WC(6,4)=1 | WC(6,5)=1 | WC(6,6)=1 | WC(6,7)=1 | WC(6,8)=1 |
| WC(7,1)=1 | WC(7,2)=1 | WC(7,3)=1 | WC(7,4)=1 | WC(7,5)=1 | WC(7,6)=1 | WC(7,7)=1 | WC(7,8)=1 |
| WC(8,1)=1 | WC(8,2)=1 | WC(8,3)=1 | WC(8,4)=1 | WC(8,5)=1 | WC(8,6)=1 | WC(8,7)=1 | WC(8,8)=1 |

DECOMPRESSED IMAGE PORTION 108
----
COMPRESSED IMAGE PORTION 108'

*Fig. 7C*

WEIGHTING VALUES FOR
MASTER_C SIGNATURE SET 104C
AFTER ADAPTIVE WEIGHTING STEP

FORM 100C
140C'
GRID 102

| WC(1,1)=1 | WC(1,2)=1 | WC(1,3)=1 | WC(1,4)=1 | WC(1,5)=1 | WC(1,6)=1 | WC(1,7)=1 | WC(1,8)=1 |
| WC(2,1)=1 | WC(2,2)=1 | WC(2,3)=1 | WC(2,4)=1 | WC(2,5)=1 | WC(2,6)=1 | WC(2,7)=1 | WC(2,8)=1 |
| WC(3,1)=1 | WC(3,2)=1 | WC(3,3)=1 | WC(3,4)=1 | WC(3,5)=1 | WC(3,6)=1 | WC(3,7)=1 | WC(3,8)=1 |
| WC(4,1)=1 | WC(4,2)=1 | WC(4,3)=1 | WC(4,4)=1 | WC(4,5)=1 | WC(4,6)=1 | WC(4,7)=1 | WC(4,8)=1 |
| WC(5,1)=1 | WC(5,2)=1 | WC(5,3)=1 | WC(5,4)=1 | WC(5,5)=1 | WC(5,6)=1 | WC(5,7)=1 | WC(5,8)=1 |
| WC(6,1)=0 | WC(6,2)=0 | WC(6,3)=1 | WC(6,4)=1 | WC(6,5)=1 | WC(6,6)=1 | WC(6,7)=1 | WC(6,8)=1 |
| WC(7,1)=0 | WC(7,2)=0 | WC(7,3)=1 | WC(7,4)=1 | WC(7,5)=1 | WC(7,6)=1 | WC(7,7)=1 | WC(7,8)=1 |
| WC(8,1)=1 | WC(8,2)=1 | WC(8,3)=1 | WC(8,4)=1 | WC(8,5)=1 | WC(8,6)=1 | WC(8,7)=1 | WC(8,8)=1 |

DECOMPRESSED IMAGE PORTION 108
--------
COMPRESSED IMAGE PORTION 108'

AFTER ADAPTIVE WEIGHTING STEP
SQUARE OF DIFFERENCE VALUES BETWEEN
VALUES OF MASTER_C SIGNATURE SET 104C AND 120C FORM 100C
VALUES OF FORM_1 SIGNATURE SET 106(1) GRID 102
TOTAL SC' = 0

| SC(1,1)=0 | SC(1,2)=0 | SC(1,3)=0 | SC(1,4)=0 | SC(1,5)=0 | SC(1,6)=0 | SC(1,7)=0 | SC(1,8)=0 |
|---|---|---|---|---|---|---|---|
| SC(2,1)=0 | SC(2,2)=0 | SC(2,3)=0 | SC(2,4)=0 | SC(2,5)=0 | SC(2,6)=0 | SC(2,7)=0 | SC(2,8)=0 |
| SC(3,1)=0 | SC(3,2)=0 | SC(3,3)=0 | SC(3,4)=0 | SC(3,5)=0 | SC(3,6)=0 | SC(3,7)=0 | SC(3,8)=0 |
| SC(4,1)=0 | SC(4,2)=0 | SC(4,3)=0 | SC(4,4)=0 | SC(4,5)=0 | SC(4,6)=0 | SC(4,7)=0 | SC(4,8)=0 |
| SC(5,1)=0 | SC(5,2)=0 | SC(5,3)=0 | SC(5,4)=0 | SC(5,5)=0 | SC(5,6)=0 | SC(5,7)=0 | SC(5,8)=0 |
| SC(6,1)=0 | SC(6,2)=0 | SC(6,3)=0 | SC(6,4)=0 | SC(6,5)=0 | SC(6,6)=0 | SC(6,7)=0 | SC(6,8)=0 |
| SC(7,1)=0 | SC(7,2)=0 | SC(7,3)=0 | SC(7,4)=0 | SC(7,5)=0 | SC(7,6)=0 | SC(7,7)=0 | SC(7,8)=0 |
| SC(8,1)=0 | SC(8,2)=0 | SC(8,3)=0 | SC(8,4)=0 | SC(8,5)=0 | SC(8,6)=0 | SC(8,7)=0 | SC(8,8)=0 |

DECOMPRESSED IMAGE PORTION 108
COMPRESSED IMAGE PORTION 108'

AFTER ADAPTIVE WEIGHTING STEP
SQUARE OF
VALUES OF MASTER_C SIGNATURE SET 104C  115C   FORM 100C
FOR MASTER_C BIT MAP IMAGE 110C   GRID 102
TOTAL XC' = 279

| XC(1,1)=0 | XC(1,2)=0 | XC(1,3)=4 | XC(1,4)=9 | XC(1,5)=4 | XC(1,6)=9 | XC(1,7)=1 | XC(1,8)=0 |
|---|---|---|---|---|---|---|---|
| XC(2,1)=0 | XC(2,2)=0 | XC(2,3)=1 | XC(2,4)=4 | XC(2,5)=4 | XC(2,6)=4 | XC(2,7)=4 | XC(2,8)=0 |
| XC(3,1)=0 | XC(3,2)=0 | XC(3,3)=1 | XC(3,4)=4 | XC(3,5)=25 | XC(3,6)=4 | XC(3,7)=25 | XC(3,8)=0 |
| XC(4,1)=0 | XC(4,2)=0 | XC(4,3)=9 | XC(4,4)=9 | XC(4,5)=1 | XC(4,6)=9 | XC(4,7)=4 | XC(4,8)=0 |
| XC(5,1)=36 | XC(5,2)=36 | XC(5,3)=0 | XC(5,4)=0 | XC(5,5)=0 | XC(5,6)=0 | XC(5,7)=0 | XC(5,8)=0 |
| XC(6,1)=0 | XC(6,2)=0 | XC(6,3)=0 | XC(6,4)=0 | XC(6,5)=0 | XC(6,6)=0 | XC(6,7)=0 | XC(6,8)=0 |
| XC(7,1)=0 | XC(7,2)=0 | XC(7,3)=0 | XC(7,4)=0 | XC(7,5)=0 | XC(7,6)=0 | XC(7,7)=0 | XC(7,8)=0 |
| XC(8,1)=36 | XC(8,2)=36 | XC(8,3)=0 | XC(8,4)=0 | XC(8,5)=0 | XC(8,6)=0 | XC(8,7)=0 | XC(8,8)=0 |

DECOMPRESSED IMAGE PORTION 108
COMPRESSED IMAGE PORTION 108'

METHOD AND SYSTEM FOR FAST FORMS RECOGNITION OF DOCUMENT FORM IMAGES

BACKGROUND OF THE INVENTION

1. Technical Field

The invention disclosed broadly relates to data processing and more particularly relates to forms recognition of document forms.

2. Background Art

This patent application is related to the U.S. Pat. No. 5,251,273 entitled "Data Processing System and Method for Sequentially Repairing Character Recognition Errors for Scanned Images of Document Forms," by T. S. Betts, et al., the application being assigned to the IBM Corporation and incorporated herein by reference.

This patent application is also related to the U.S. Pat. No. 5,305,396 entitled "Data Processing System and Method for Selecting Customized Character Recognition Processes and Coded Data Repair Processes for Scanned Images of Document Forms," by T. S. Belts, et al., the application being assigned to the IBM Corporation and incorporated herein by reference.

This patent application is also related to U.S. Pat. No. 5,140,650, entitled "A Computer Implemented Method for Automatic Extraction of Data From Printed Forms," by R. G. Casey, et al., the patent being assigned to the IBM Corporation and incorporated herein by reference.

This patent application is also related to the U.S. Pat. No. 5,455,872 entitled "System and Method for Enhanced Character Recognition Accuracy by Adaptive Probability Weighting," by M. P. T. Bradley, the application being assigned to the IBM Corporation and incorporated herein by reference.

This patent application is also related to copending U.S. patent application by D. W. Billings, et al. entitled "Method for Defining a Plurality of Form Definition Data Sets," Ser. No. 08/100,846, filed Aug. 2, 1993 now pending, the application being assigned to the IBM Corporation and incorporated herein by reference.

3. Background Art

The referenced Billings, et al patent application, describes how forms are created by a forms definition utility program. A forms definition data set is prepared at a data center, which characterizes the preprinted background of the master form. The forms definition data set is associated with a form ID. Copies of the master form are distributed to persons who will fill out the fields entering data by hand or by typewriter. The completed forms are returned to the data center and are scanned into the system. To accommodate sessions of high volume scanning of submitted forms, the image of each form is compressed and buffered until there is an opportunity to continue its processing.

The compressed form is then decompressed, and the image of the completed form is subjected to a forms recognition program to identify the ID of the form. Once identified, the master form definition data set can be accessed. This enables the system to locate the fields on the form and subtract out the preprinted background of the form. The extracted field images can then be presented to a character recognition program, which analyzes them and outputs alphanumeric strings representing the images of the data in the fields. If there are suspicious characters or errors in the recognition process, the character recognition program will also output error statistics.

Several problems surround conventional techniques to perform forms recognition. First, the speed of forms recognition is relatively slow, when compared to other steps in forms processing. Many conventional forms recognition algorithms are slow, such as line geography techniques. The process of decompressing the compressed image is also slow, since conventional techniques are based on analyzing the entire page of the form, requiring the entire form to be decompressed. In addition, significant problems appear with the condition of the completed forms, themselves. Many submitters fold, spindle, staple or otherwise mutilate the form, and each artifact will appear in the image of the form. Such artifacts reduce the accuracy of forms recognition and occasionally the wrong ID is attributed to a completed form image. This will not be apparent until the character recognition program returns high error statistics for the form.

OBJECTS OF THE INVENTION

It is therefore an object of the invention to increase the speed of forms recognition.

It is another object of the invention to provide a faster forms recognition method.

It is another object of the invention to provide a more accurate forms recognition method.

It is another object of the invention to provide a faster forms recognition method, that does not require the entire form to be decompressed.

It is another object of the invention to provide a more accurate forms recognition method, that compensates for the average condition of the completed forms.

It is another object of the invention to provide a more accurate forms recognition method, that compensates for the average artifacts which appear in the image of the form.

It is another object of the invention to provide a more accurate forms recognition method, that compensates for the average condition of the form in response to the character recognition program returning high error statistics for the form.

SUMMARY OF THE INVENTION

These and other objects, features and advantages are accomplished by the fast forms recognition invention disclosed herein. In one aspect of the present invention when a new master form is processed, a master signature set is computed.

The form signature set is compared with the master signature set. A difference matrix is computed, taking the difference between the pixel counts for each cell in the master and in the completed form. This is done for each master signature set in the system, until a best match is found between the completed form and one of the master forms. Several analytical processing techniques are disclosed to determine the best match. One technique which has been found superior to others, is squaring each difference value and summing the squares. This sum is then divided by the sum of the squares for the master form being tried in the matching process. That master form having the lowest ratio, is most likely the best match among the master forms. Several other matching techniques are also disclosed. These methods are faster than the line geography technique and they also contribute the an improvement in the speed of forms recognition.

When the best match master form is identified, its form ID is sent to the field extraction program and the character recognition program. The field extraction program locates the fields of the form, using the form definition data set identified by the ID value. The field images are separated from the image of the preprinted background. The extracted field images are then processed by the character recognition program.

Another aspect of the invention is an automatic learning process, by which the invention can make adjustments to the master signature set or alternately to a weighting mask used with the master signature set, in response to error statistics reported by the character recognition program for that master form. The adjustments are made to reduce the sensitivity to those cells which frequently bear random marks, that confuse the distinctions between otherwise different master forms. Adjustments can also be made to increase the sensitivity to those cells which are typically constant in their pixel value for one master form, and significantly different in the cell value for all other master forms stored in the system.

To make the adjustment to reduce the sensitivity to those cells which have randomly variable pel counts, the invention monitors the error statistics reported by the character recognition program. If one particular master form ID is found to be causing more than a predetermined threshold quantity of errors, the invention enters a learning mode. In this mode, the invention stores the form signature set for each completed form that is processed for forms recognition, having the ID of the master form causing the high error statistics. After a predetermined quantity of forms having that ID have been accumulated, their form signature sets are analyzed. The analysis computes the standard deviation for a given cell location over all of the accumulated forms having that ID. If a given cell location has a relatively large standard deviation in the pixel count, that cell is considered to have randomly variable markings in the completed forms. In accordance with the invention, the effect of that cell is reduced in the matching process, when that master form is being matched with a completed form. One technique for reducing the sensitivity of the matching process to a cell, is by modifying a weighting set associated with that master form's master signature. The weighting set is an array of multiplicative values, one for each cell. For example, when the master form is defined, all of the values in the weighting set can have the value of unity. Each time the master form signature set is compared with a form signature set, each value in the difference matrix can be multiplied by the weight for that cell in the weighting set. When the sensitivity of the matching process is to be reduced for a particular cell, the value of the weight for that cell is reduced. In this manner, the invention learns which of the cells are variable for a given master form, and those cells are less important to the natching process for finding the ID of a completed form.

DESCRIPTION OF THE FIGURES

These and other objects, features and advantages will be more fully appreciated with reference to the accompanying figures.

FIG. 3D shows the values of master A signature set 104A from master A bit map image 110A.

FIG. 3E shows master B signature set 104B.

FIG. 3G shows the values of the master B signature set 104B for the master B bit map image 110B.

FIG. 3H shows the master C signature set 104C.

FIG. 3J shows the values of master C signature set 104C for master signature C bit map image 110C.

FIG. 3K shows the square of values of master A signature set 104A for master A bit map image 110A.

FIG. 3L shows the square of values of master B signature set 104B for master B bit map image 110B.

FIG. 3M shows the square of values of master C signature set 104C for master bit map image 110C.

FIG. 4A shows the form 1 signature set 106(1).

FIG. 4C shows the values of form 1 signature set 106(1) for form 1 bit map image 112(1).

FIG. 4D shows the form 2 signature set 106(2).

FIG. 4F shows the values of form 2 signature set 106(2) for form 2 bit map image 112(2).

FIG. 4G shows the form 3 signature set 106(3).

FIG. 4I shows the values of form 3 signature set 106(3) for form 3 bit map image 112(3).

FIG. 5A shows the difference values between values of master A signature set 104A and values of form 1 signature 106(1).

FIG. 5B shows difference values between values of master B signature set 104B and values of form 1 signature set 106(1).

FIG. 5C shows difference values between values of master C signature set 104C and values of form 1 signature set 106(1).

FIG. 6A shows the square of difference values between values of master A signature set 104A and values of form 1 signature set 106(1).

FIG. 6B shows the square of difference values between values of master B signature set 104B and values of form 1 signature set 106(1).

FIG. 6C shows the square of difference values between values of master C signature set 104C and values of form 1 signature set 106(1).

FIG. 7A shows weighting values for master A signature set 104A.

FIG. 7B shows weighting values for master B signature set 104B.

FIG. 7C shows weighting values for master C signature set 104C before adaptive weighting step.

FIG. 7D shows weighting values for master C signature set 104C after adaptive weighting step.

FIG. 7E shows after the adaptive weighting step, the square of difference values between values of master C signature set 104C and values of form 1 signature set 106(1).

FIG. 7F shows after the adaptive weighting step, the square of values of master C signature set 104C for master C bit map image 110C.

FIG. 9 depicts a bit map of a 1040 income tax form, showing the location of a cell array used for forms recognition, in accordance with the invention.

DISCUSSION OF THE PREFERRED EMBODIMENT

The invention disclosed herein solves the problem of increasing the speed of forms recognition while maintaining accurate forms recognition results. The invention provides faster forms recognition by not requiring the entire compressed form to be decompressed. The invention provides more accurate forms recognition that compensates for the average condition of completed forms. The invention provides more accurate forms recognition that compensates the average artifacts which appear in the image of a form. The invention provides a more accurate :forms recognition by compensating for the average condition of the form in response to the character recognition program returning high error statistics for the form.

Figure 1:
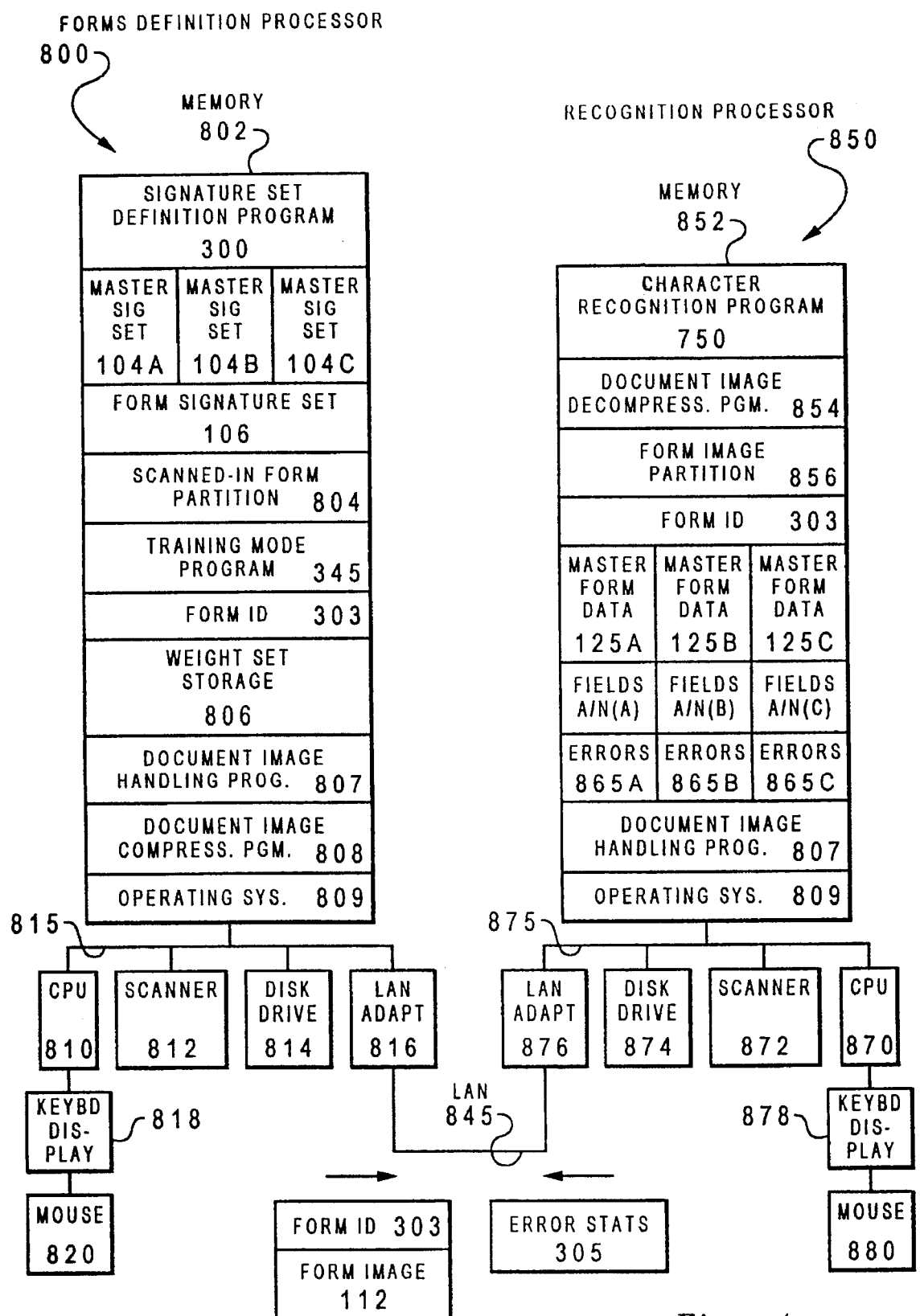
FIG. 1 is a architecture block diagram of the invention.

FIG. 1 shows an overall functional block diagram of the invention. The system shown in FIG. 1 includes a forms definition processor 800 and a recognition processor 850. Both of these processors could be combined into a single workstation processor, however it is helpful to show them as separate processors to clarify the description of the system. The forms definition processor 800 includes the memory 802 which is connected by means of the bus 815 to the CPU 810, the keyboard and display 818, and the mouse pointing device 820. The bus 815 is also connected to the scanner 812, the disk drive 814, and the local area network (LAN) adapter 816. The local area network adapter 816 is connected over the local area network 845 to the local area network adapter 876 of the recognition processor 850.

The memory 802 of the forms definition processor 800, includes partitions for the signature definition program 300, three example master signature sets 104A, 104B, and 104C, of the form signature set 106. Also included are partitions for a scanned-in form partition 804, the training mode program 345, and the register for the form ID 303. A weight set storage 806 is included along with a document image handling program 807, a document image compression program 808, and an operating system 809. All of the programs stored in the memory 802 are sequences of executable instructions, which were executed on the CPU 810, perform the intended operations.

The recognition processor 850 includes the memory 852, which is connected over the bus 875 to the LAN adapter 876, the disk drive 874, the scanner 872, the CPU 870, the keyboard and display 878, and the mouse pointing device 880. The memory 852 of the recognition processor 850, includes partitions for the character recognition program 750, document image decompression program 854, form image partition 856, and a form ID register 303. Also included are three example master form definition data sets 125A, 125B and 125C. Also included are partitions for storing the output fields corresponding to the three different master form definition data sets 125A, 125B, and 125C, those partitions being the fields alphanumeric (A), fields alphanumeric (B), and fields alphanumeric (C), abbreviated "A/N(A), etc. Also included are partitions for storing the errors for suspicious characters and misrecognized characters output from the character recognition program 750, in conjunction with master form definition data set 125A, 125B and 125C, those partitions being the error partitions 865A, 865B and 865C. Also included in the memory 852 is the document image handling program 807 and the operating system 809. The program stored in the memory 852, are sequences of executable instructions which, when executed in the CPU 870, carry out the intended operations.

Figure 2:
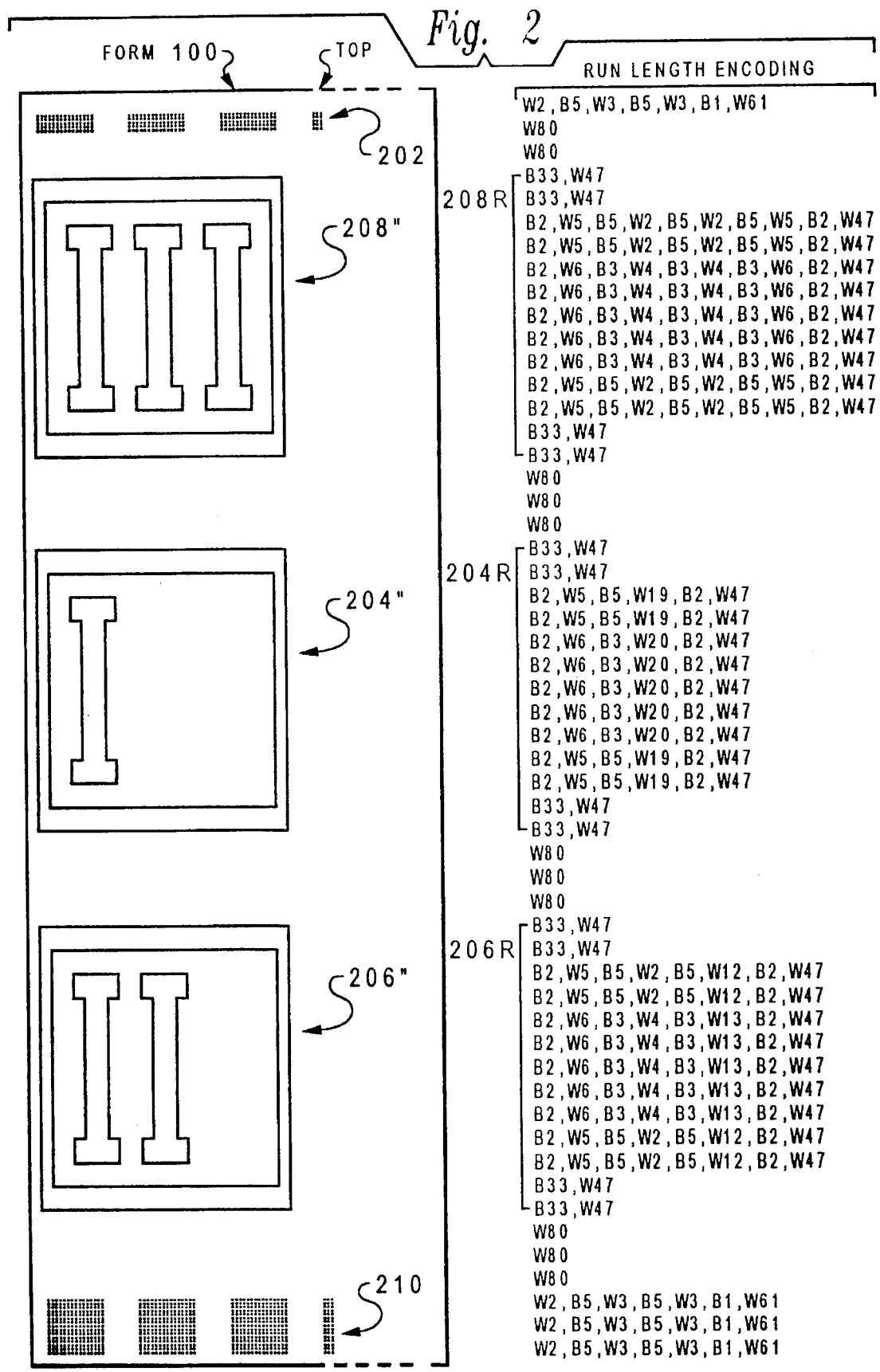
FIG. 2 illustrates an example image compression technique.

FIG. 2 is an illustration of the principles of image compression, as it is used in conjunction with the invention disclosure N. Additional information on image compression can be found in the above cited Billings patent application. FIG. 2 illustrates an example of a form image A3205 which the fields 208", 200" and 206" are shown with their corresponding run length encoding compression fields 208R, 200R and 206R, respectively. It is seen that near the top of the form 205, a line of characters 202 exist and also near the bottom of the form another several lines of characters 210 exist. In FIG. 2 it is seen that the corresponding lines of black and white pixels in the form 205, are arranged in a vertical manner. Compression proceeds from the top of the form to the bottom. Decompression would also proceed from the top of the form to the bottom, requiring the decompression operation to proceed through most of the lines of the form 205, before getting to the bottom portion of the lowest field of interest, 206". This would require a substantial amount of time for decompression.

One of the features of the invention disclosed herein, is that it reduces the amount of the compressed image which must be decompressed in order to perform a fast and accurate forms recognition operation.

Figure 3A:
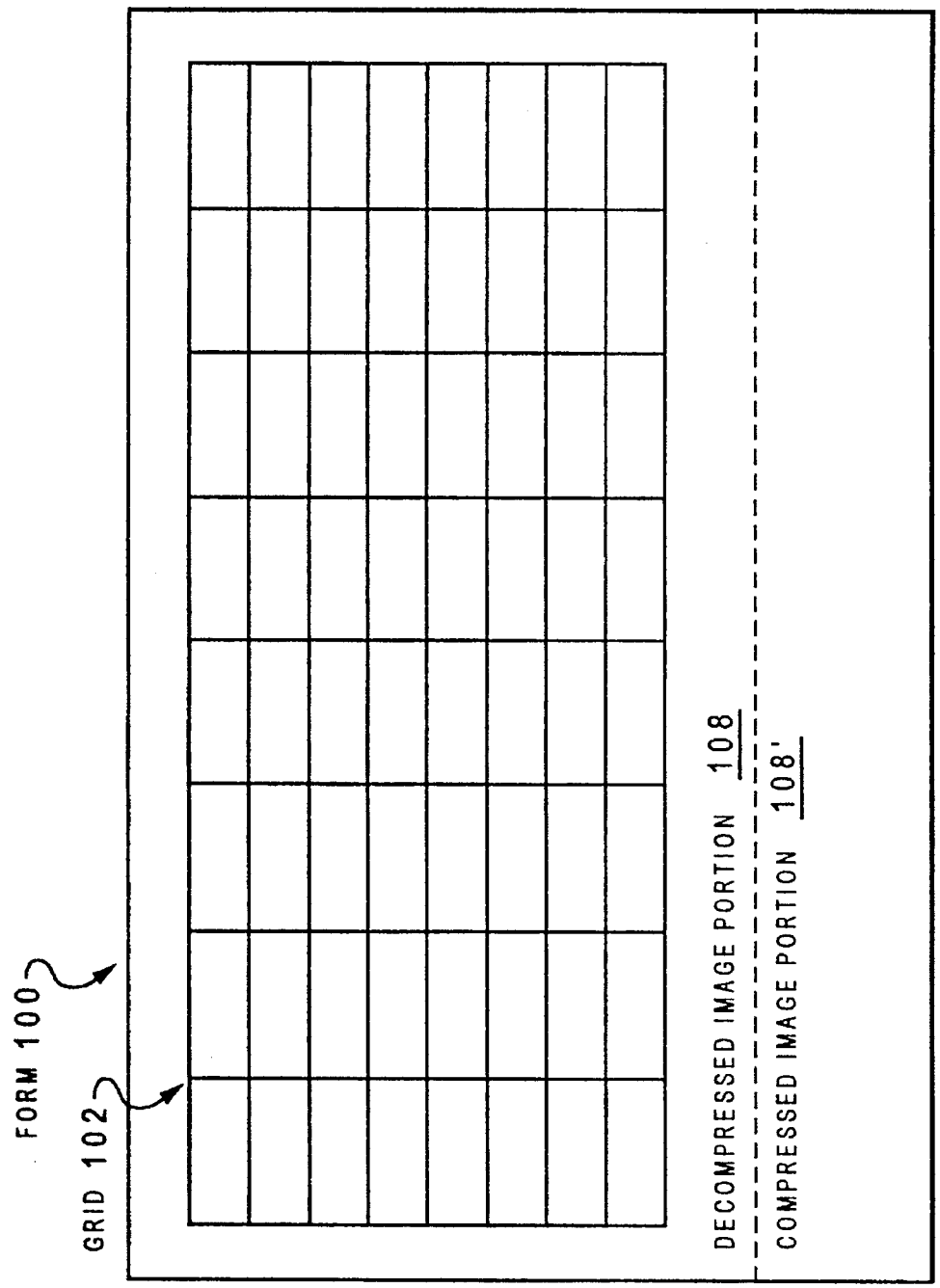
FIG. 3A shows the grid 102.

Turning now to FIG. 3A, the figure shows a grid 102 which is laid out at the top of the form 100, for performing forms recognition in accordance with the invention. It is seen at the top portion of the form 100 is a decompressed image portion 108, and the remaining compressed image portion 108', is not decompressed in order to carry out a fast and accurate forms recognition operation.

Figure 3B:
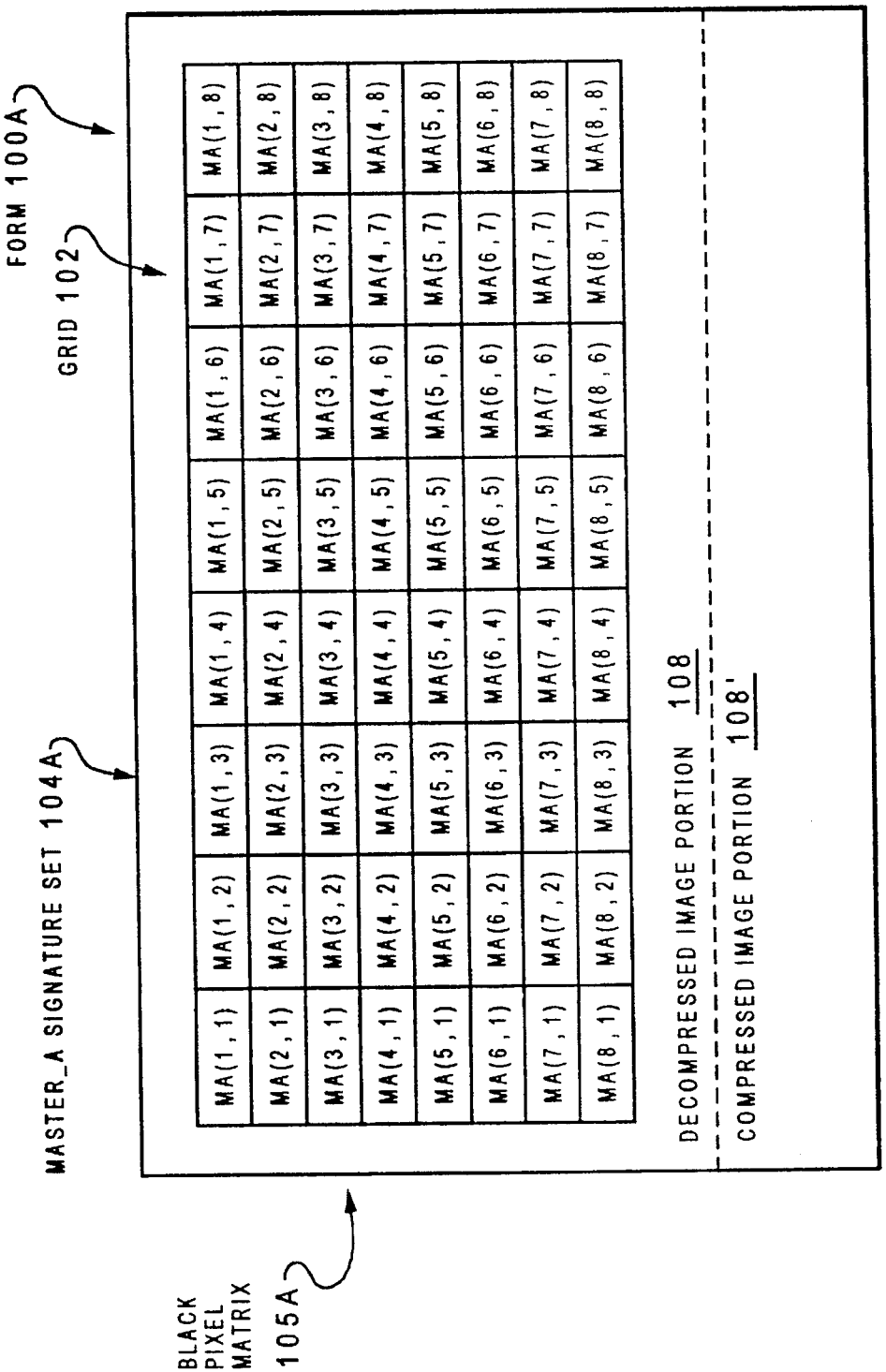
FIG. 3B shows the master A signature set 104A.

FIG. 3B shows an example signature set 104A for a first master form, master A. In accordance with the invention, when a new master form is processed, the invention computes a master signature set. This is the pixel count value in each cell of an array of cells located near the top of the master form. The pixel cells in FIG. 3B are labeled in standard matrix notation, MA(1,1), etc. with the first index being the row and the second index being the column for the matrix of FIG. 3B. When each completed form is scanned into the system, it is compressed and buffered. In accordance with the invention, when the compressed completed form is ready to be analyzed, only its top part needs to be decompressed. A form signature set is prepared for the decompressed pan of the completed form in the same manner as the form signature set was prepared. One aspect of the invention is the limitation of the array of cells in the upper part of the form, thereby rendering unnecessary the need to decompress more than that part of the form. By merely decompressing the first N rows of the form, the rest of the form does not have to be decompressed. For example in FIG. 3B, the first eight rows of the form are decompressed. This makes one contribution to improving the speed of forms recognition, in accordance with the invention.

Figure 3C:
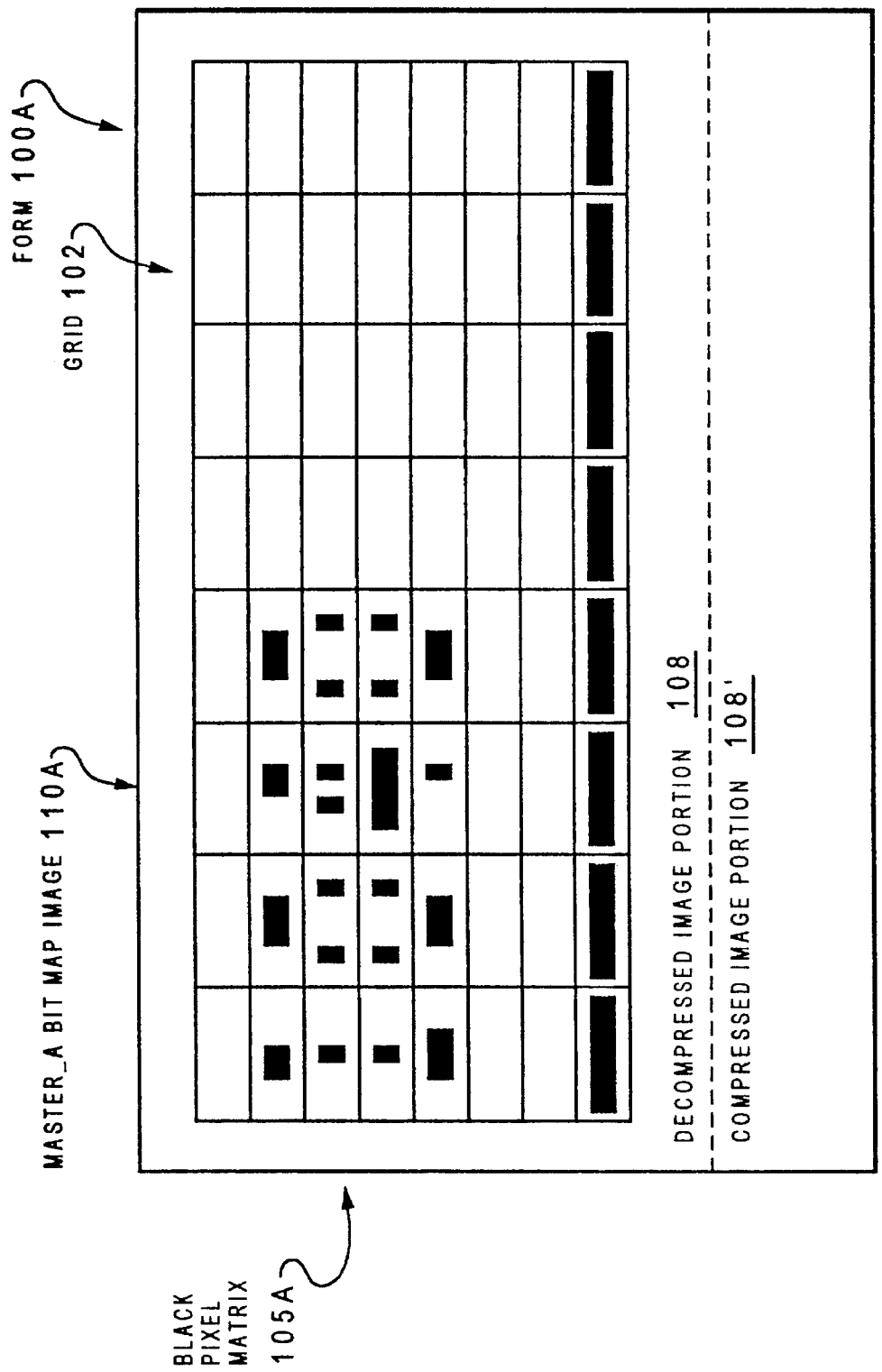
FIG. 3C shows the master A bit map image 110A.

FIG. 3C shows the master A bit map image 110A which has been scanned into the system, compressed and buffered. Thereafter, the compressed image file was decompressed so that the top eight lines of the image are displayed, as is shown for the black pixel matrix 105A for the form 100A of FIG. 3C.

FIG. 3D shows the values of the master A signature set 104A for the master A bit map image 110A. This is for the form 100A which is shown in FIG. 3C and whose signature set notation is shown in FIG. 3B. The computation of the values for each cell in the master signature set 104A of FIG. 3D, is simply to count the number of pixels in each respective cell and as the value of the cell. In some applications, if the cell is large enough to encompass many pixels so that a very large number is encountered, all of the pixel counts for the all of the cells can be decreased by the same fraction for convenience of the computation.

Figure 3F:
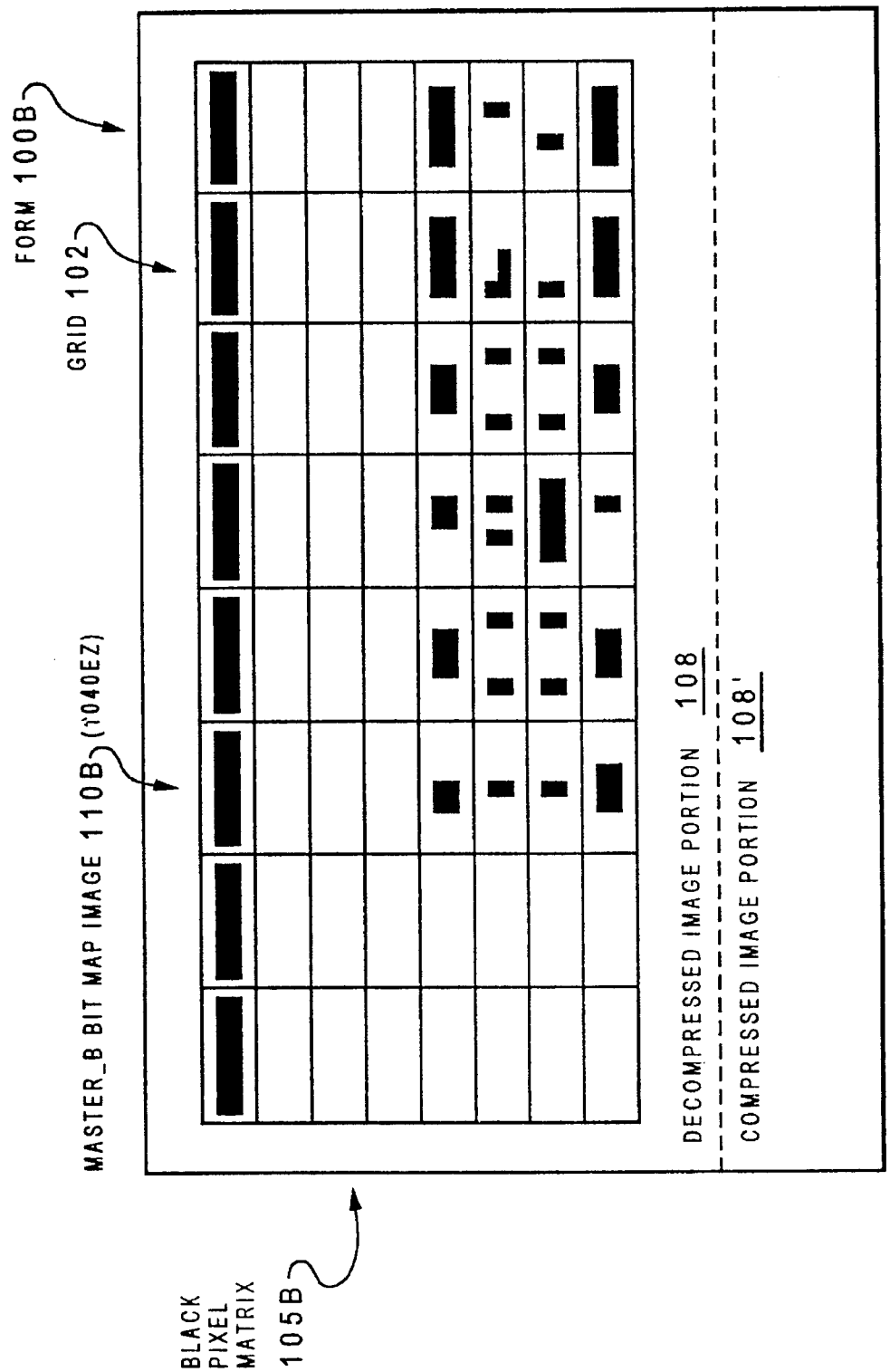
FIG. 3F shows master B bit map image 110 (1040EZ).

FIGS. 3E, 3F and 3G pertain to a second master B form, with FIG. 3E showing the master B signature set notation, FIG. 3F showing the bit map image of the form, and FIG. 3G showing the values in the master B signature set for form 100B.

Figure 3I:
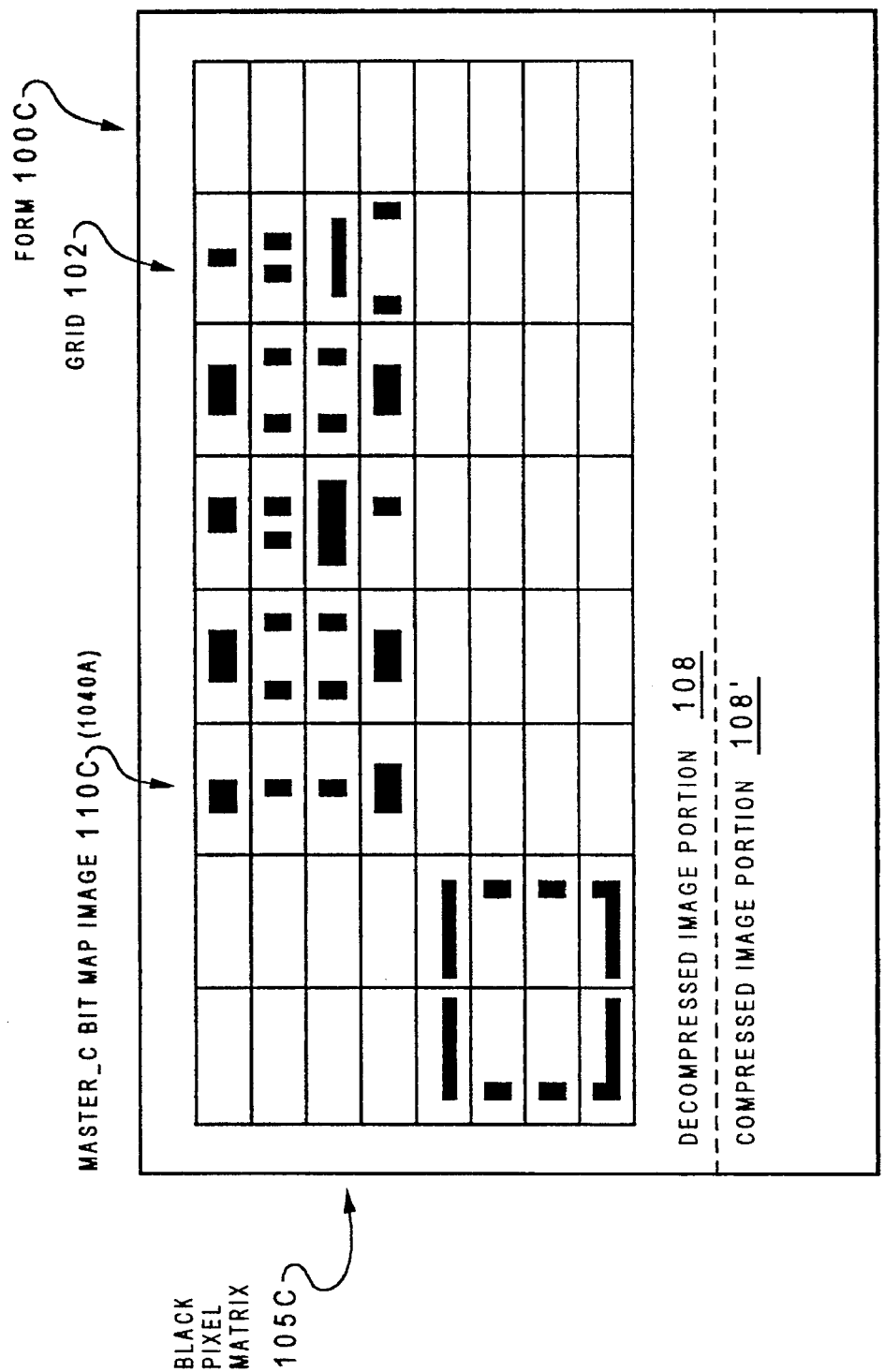
FIG. 3I shows the master C bit map image 110C (1040A).

FIGS. 3H, 3I and 3J show a third master C form, with FIG. 3H showing the master C signature set notation, FIG. 3I showing the bit map image for master C form 100C, and FIG. 3J showing the values in the master C signature set 104C.

Later it will be shown that for one form of a matching process, the square of the values of each master signature set are required. This is provided in FIGS. 3K, 3L and 3M, for the master signature sets 104A, 104B and 104C, respectively, getting the square of the values 115A, 115B and 155C, respectively.

Figure 4B:
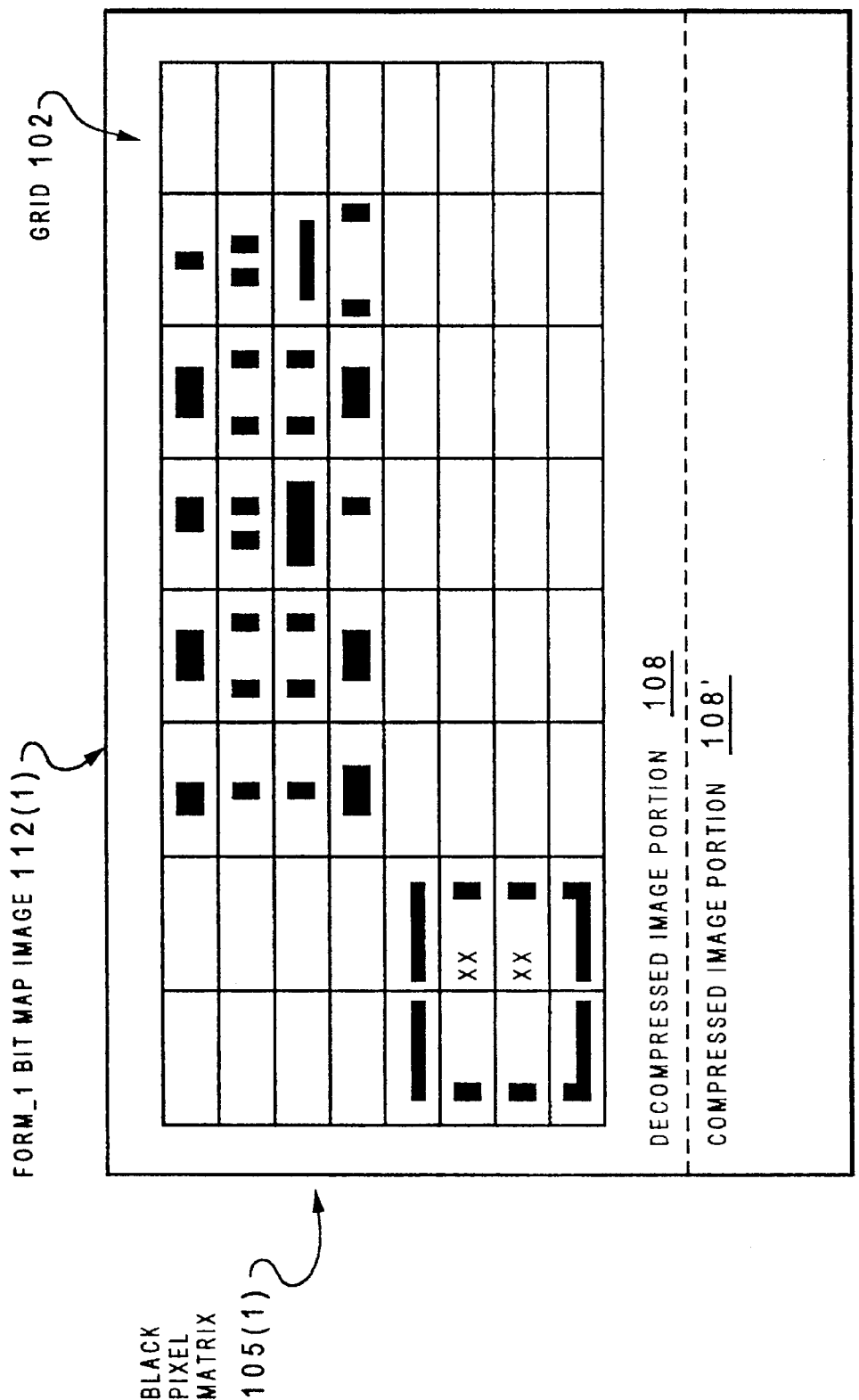
FIG. 4B shows the form 1 bit map image 112(1).

One aspect of the invention is the comparison of the form signature set with the master signature set. A difference matrix is computed, taking the difference between the pixel counts for each cell in the master and in the completed form. This is done for each master signature set in the system, until a best match is found between the completed form and one of the master forms. Reference is made to FIGS. 4A, 4B and 4C, which show a first completed form, form 1. FIG. 4A shows the notation for form 1 signature set 106(1), FIG. 4B shows the black pixel matrix 105(1) for the form 1 bit map image 112(1), and FIG. 4C shows the values of form 1 signature set 106(1) for form 1 bit map image 112(1). It is seen in FIG. 4C that each cell has a value equal to the number of pixels which appear in it.

Figure 4E:
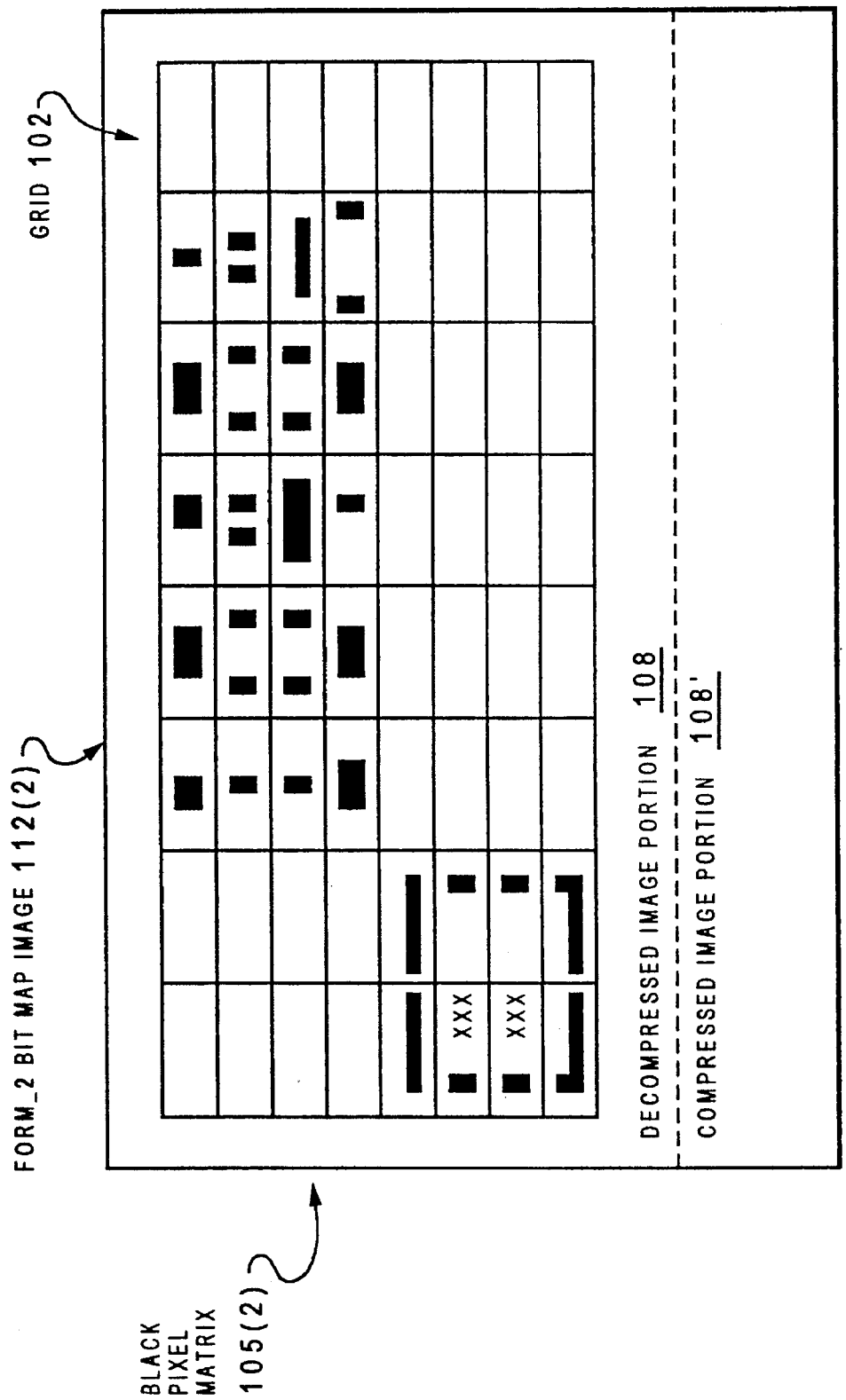
FIG. 4E shows the form 2 bit map image 112(2).

FIGS. 4D, 4E and 4F show a similar set of three figures for a second completed form, form 2. FIG. 4D shows the signature set 106(2), FIG. 4E shows the bit map image 112(2), and FIG. 4F shows the values of the form 2 signature set 106(2).

Figure 4G:
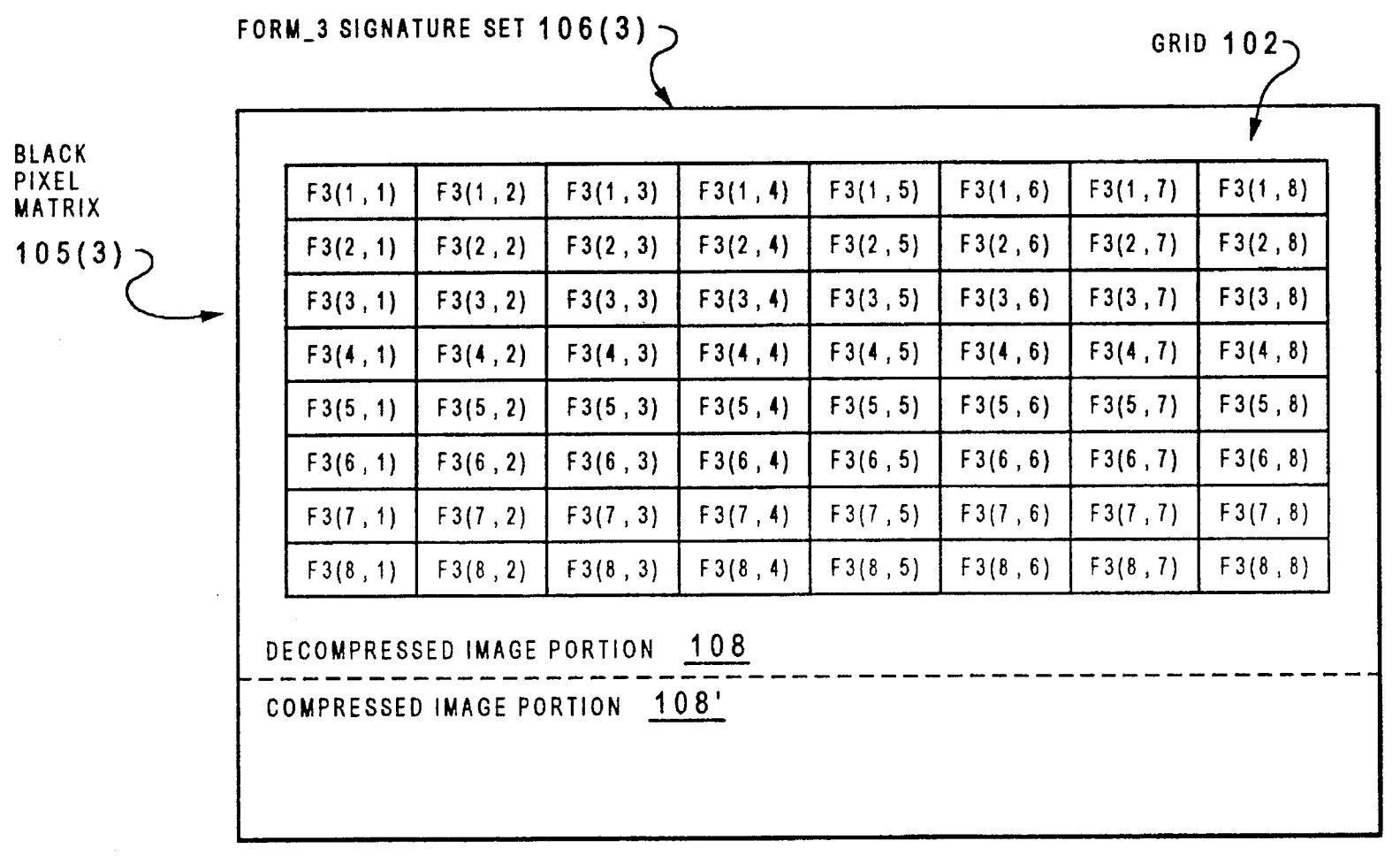
Figure 4H:
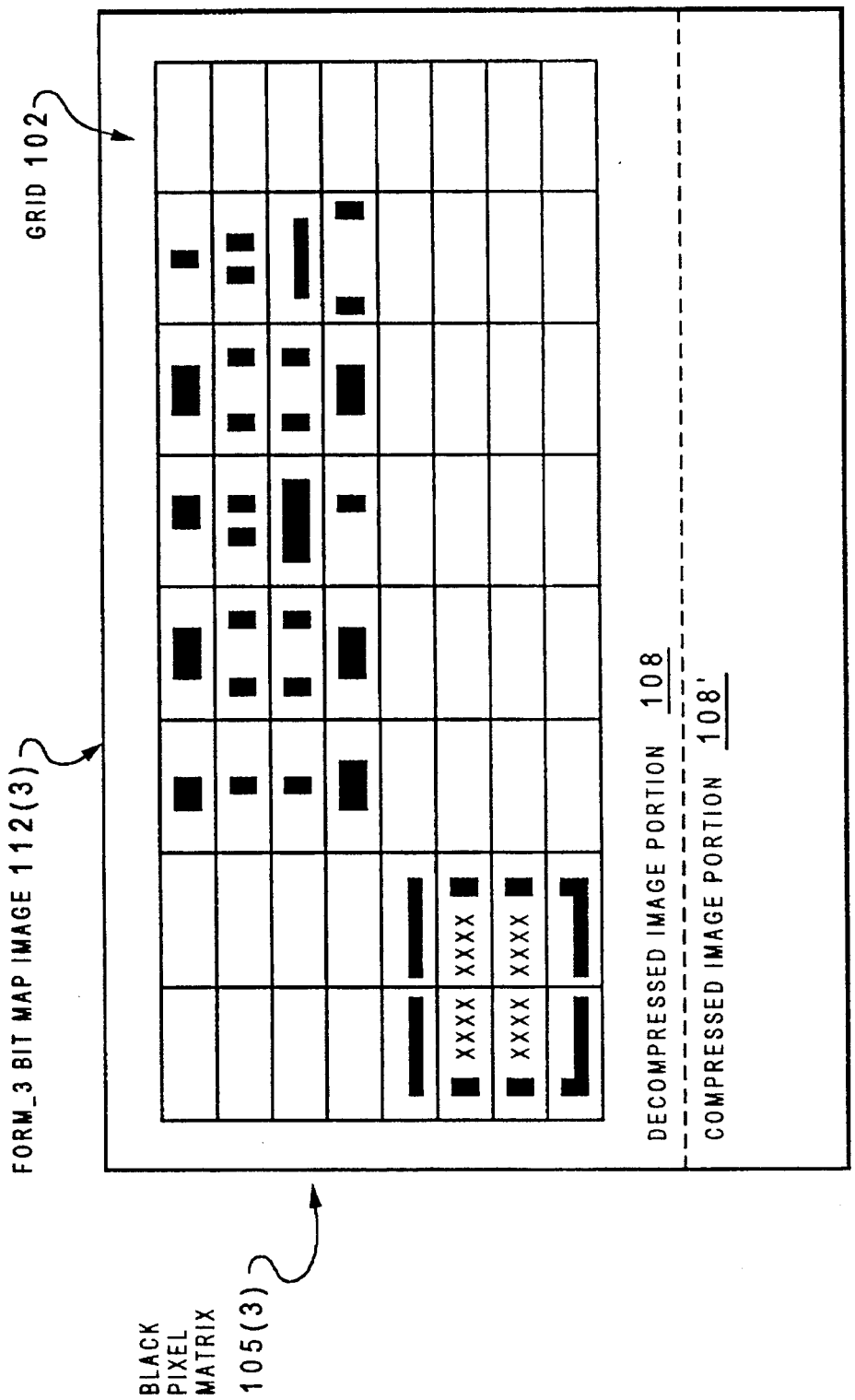
FIG. 4H shows the form 3 bit map image 112(3).

FIGS. 4G, 4H and 4I show a similar set of three figures for a third completed form, form 3. FIG. 4G shows form 3 signature set 106(3), FIG. 4H shows the bit map image 112(3), and FIG. 4I shows the values of form 3 signature set 106(3).

Examination of FIGS. 4B, 4E and 4H will show that all three bit maps are the same basic master image form, a 1040A tax form. It should be noted that there is a mark sense box in the lower left corner of the grid 102. It should also be noted that there is an artifact contained in the box at the lower left corner which varies in its configuration between FIGS. 4B, 4E and 4H. One aspect of the invention is an automatic learning process, by which the invention can make adjustment to the master signature set or alternately to a weighting mask used with the master signature set, in response to error statistics recorded by the character recognition program for that master form. Adjustments are made to reduce the sensitivity to those cells which frequently bear random marks, that confuses the distinctions between otherwise different master forms. This is shown in the example of FIGS. 4B, 4E and 4H.

The comparison of the form signature set with the master signature set can be conducted in several methods. However in each, a difference matrix is computed, taking the difference between the pixel counts for each cell in the master and in the completed form. This is shown in FIGS. 5A, 5B and 5C, for the difference values between the form 1 signature set 106(1) and each of three master signature sets 104A, 104B and 104C. The array 120A for the difference values with respect to master A signature set, use the matrix notation DA(1,1), etc.; similarly for 120B in FIG. 5B and 120C in FIG. 5C.

Several analytic processing techniques can be used to determine the best match. One technique which has been found superior to the others, is squaring each difference value and summing the square. This sum is then provided by the sum of the squares for the master form being tried in the matching process. That master form having the lowest ratio, is most likely the best match among the master forms. If a form which has been identified as a best matching form using the squaring technique, is subsequently sent to the character recognition processor, character recognition operations will be performed using the forms definition data set corresponding to that identified master form. If the character recognition processor outputs a high error statistic while using that master form, this can be reported back from the recognition processor 850 back to the forms definition processor 800, and the second most likely candidate master form can then be substituted for a second trial.

FIGS. 6A, 6B and 6C prepare for the squaring process for matching. FIG. 6A is the array 130A which is the square of the difference values between values of master A signature set 104A, and values of form 1 signature set 106(1). FIG. 6B is a similar array 130B, for the master B signature set. FIG. 6C is a similar array 130C for the master C signature set 104C.

The sum of the square of the difference values in the master A signature set and the values of form 1 signature set is 482. The sum of the square of the difference values for the master B signature set in form 1 is 760. The sum of the square of the difference values between the master C signature set and form 1 is eight.

Referring back to FIGS. 3K, 3L and 3M, the square of the values of the master A signature set 115A is 493. The square of the value of the master B signature set is 605, and the square of the values of the master C signature set is 283.

The sum of the square is then divided by the sum of the squares for the master form being tried in the matching process. Thus, in comparing FIG. 6A with FIG. 3K, for the square of the difference values between master A and form 1 divided by the square of the values for the master A signature set, a ratio of 482 divided by 493 equal 0.98.

In comparing FIG. 6B and FIG. 3L, the square of the difference values between master B signature set and form 1 signature set and the square of the values of master B signature set, the ratio is 760 divided by 605 which equals 1.26.

Comparing FIG. 6C with FIG. 3M, the square of the difference values between the master C signature set and the form 1 signature set divided by the square of the values of the master C signature set is eight divided by 283 which equals 0.03.

That master form having the lowest ratio, is the most likely to be the best match among the master forms. Thus, in accordance with the operation of the invention for this example, the master C signature set 104C is the most likely match for the form 1 signature set 106(1).

When the best match master form is identified, its form ID is sent to the field extraction program and the character recognition program. The fields extraction program locates the fields on the form, using the form definition data set identified by the ID value. The field images are separated from the image of the preprinted background. The extracted field images are then processed by the character recognition program.

Another aspect of the invention is the automatic learning process, by which the invention can make adjustments to the master signature set or alternately to a weighting mask used with the master signature set. This is done in response to error statistics reported by the character recognition program for that master form. The adjustments are made to reduce the sensitivity to those cells which frequently bear random marks, that confuse the distinctions between otherwise different master forms.

In an alternate embodiment, adjustments can also be made to increase the sensitivity to those cells which are typically constant in their pixel value for one master form, and significantly different in the cell value for all other master forms stored in the system.

To make the adjustment to reduce the sensitivity to those cells which have randomly variable pel counts, the invention monitors the error statistics reported by the character recognition program. If one particular master form ID is found to be causing more than a predetermined threshold quantity of errors, the invention enters a learning mode. In this mode, the invention stores the form signature set for each completed form that is processed for forms recognition, having the ID of the master form causing the high error statistics. After a predetermined quantity of forms having that ID have been accumulated, their form signature sets are analyzed.

The analysis computes the standard deviation for a given cell location over all of the accumulated forms having that ID. If a given cell location has a relatively large standard deviation in the pixel count, that cell is considered to have randomly variable markings in the completed forms.

In accordance with the invention, the effect of that cell which is found to be variable, is reduced in the matching process, when that master form is being matched with a completed form. One technique for reducing the sensitivity in the matching process to a cell, is by modifying a weighting set associated with that master form's master signature. The weighting set is an array of multiplicative values, one for each cell. For example, when the master form is defined, all of the values in the weighting set can have the value of unity. Each time the master form signature set is compared with the form signature set, each value in the difference matrix can be multiplied by the weight for that cell in the weighting set. When the sensitivity of the matching process is to be reduced for a particular cell, the value of the weight for that cell is reduced. In this manner, the invention learns which of the cells are variable for a given master form, and those cells are made less important to the matching process for finding the ID of a completed form.

Reference to FIGS. 7A, 7B, 7C and 7D show weighting values. FIG. 7A shows the array 140A, which are the weighting values for the master A signature set 104A. The weighting value notation is a standard matrix notation, for example WA(1,1), etc. The weighting values for the master A form in FIG. 7A are all set equal to unity.

FIG. 7B shows the weighting values in the array 140B, for the master B signature set 104B. All of the weighting values in the array 140B in FIG. 7B are set equal to unity.

FIG. 7C shows the array 140C for the weighting values for the master C signature set 104C, before the adaptive weighting step. The array 140C has all of its cells set equal to unity before the adaptive weighting step.

FIG. 7D shows the array 140C', which are the weighting values for the master C signature set 104C, as were shown in FIG. 7C, except that FIG. 7D is after the adaptive weighting step. It is of particular significance that the four cells 142, namely WC(6,1), WC(6,2), WC(7,1), and WC(7,2), have been reduced in their value from their original value of one, to a new value of zero, in response to the invention determining that those four cells are variable cells. Those four cells must have their significance reduced in their matching process, in accordance with the invention.

FIG. 7E shows the array 120C, which is after the adaptive weighting step, which takes the square of the difference values between the values for the master C signature set 104C and the values of the form 1 signature set 106(1). FIG. 7E should be compared with FIG. 6C which shows the original values where the difference values between master C signature set and form 1 signature set.

FIG. 7F shows the array 115C, after the adaptive weighting step, which is the square of the values of the master C signature 104C. It is to be noted that the cells 122 have their values reduced to zero. Referring back to FIG. 7E, it should be noted that cells 132 have had their values reduced to zero. The sum of the squares of the difference values between master C and form 1 in FIG. 7E is equal to zero. In FIG. 7F, after the adaptive weighting step, the sum of the squares of the values of the master C signature set are equal to 279. The ratio of the squares of the difference values between master C signature set and form 1 signature set after adaptive weighting (FIG. 7E) are divided by the sum of the squares of the values in the master C signature set after adaptive weighting (FIG. 7F), is zero divided by 279 which equals zero. This recomputation of matching ratio for the master C signature set and the form 1 signature set, removes any sensitivity which may exists for the four cells in the master C form 100C, corresponding to the mark sense box in the lower left-hand corner.

Figure 8A:
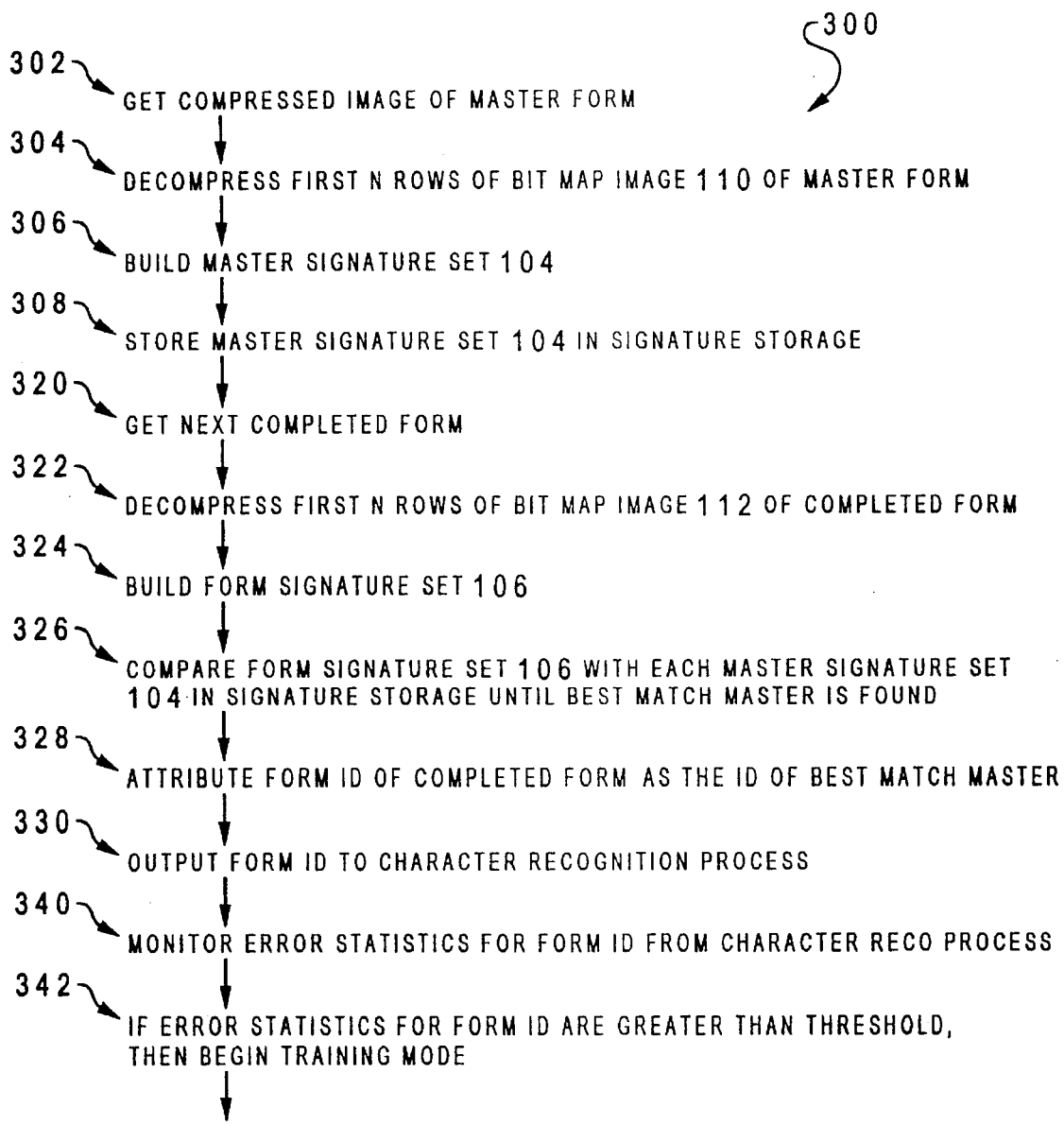
FIG. 8A shows the flow diagram of the process to define the master signature set 300.

FIG. 8A shows the flow diagram of the process 300 to define the master signature set. It goes from steps 302 to 342. Step 302 gets a compressed image of the master form. Step 304 decompresses the first N rows of the bit map image 110 of the master form. Step 306 builds a master signature set 104. Step 308 stores the master signature set 104 in signature storage. Step 320 gets the next completed form. Step 322 decompresses the first N rows of the bit map image 112 of the completed form. Step 234 builds the form signature set 106. Step 326 compares the form signature set 106 with each master signature set 104 in the signature storage until the best match master is found. Step 328 attributes the form ID of the completed form as the ID of the best match master. Step 330 outputs form ID to the character recognition process. Step 340 monitors error statistics for form ID from character recognition process. In step 342, if error statistics for form ID are greater than threshold, then begin the training mode.

Figure 8B:
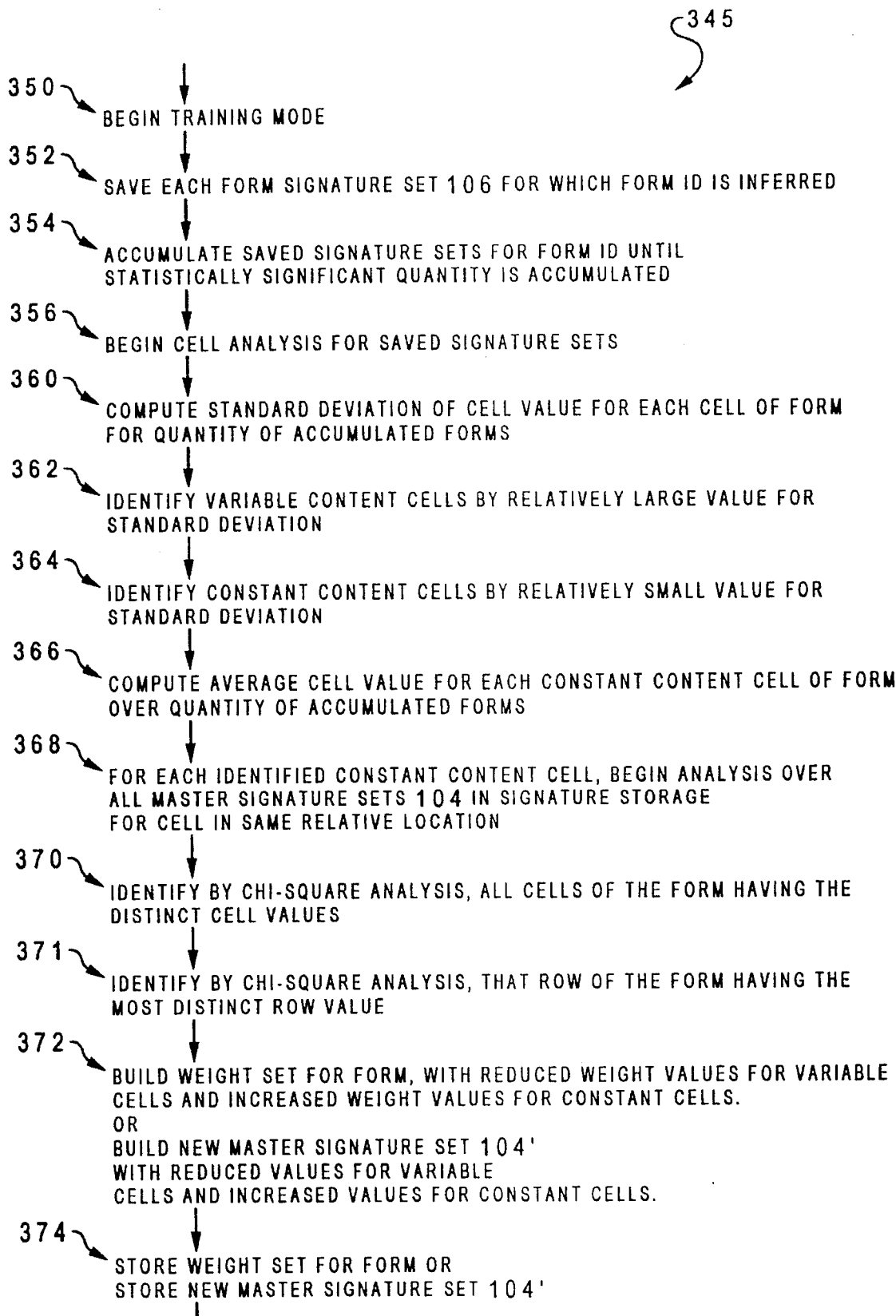
FIG. 8B shows the flow diagram of the training mode 345.

FIG. 8B shows the program 345 to begin the training mode. The training mode program goes from step 350 to step 374. Step 350 begins the training mode. Step 352 saves each form signature set 106 for which the form ID is inferred. Step 354 accumulates the saved signature sets for the form ID until a statistically significant quantity is accumulated. Step 356 begins cell analysis for saved signature sets. Step 360 computes the standard deviation of the cell value for each cell of the form for quantity of the accumulated forms. Step 362 identifies the variable content cells by a relatively large value for the standard deviation. Step 364 identifies constant content cells by a relatively small value for the standard deviation. Step 366 computes the average cell value for each constant content cell of the form over quantity of the accumulated forms. In step 368, for each identified constant content cell, begin analysis over all master signature sets 104 in a signature storage for the cell in the same relative location. Step 370 identifies by chi-square analysis, all cells of the form having the distinct cell values. Step 371 identifies by chi-square analysis, that row of the form having the most distinct row value. Step 372 builds the weight set for the form, with the reduced weight values for the variable cells and the increased weight values for the constant cells, or builds the new master signature set 104' with the reduced values for the variable cells and the increased values for the constant cells. Step 374 stores the weight set for the form or stores the new master signature set 104'.

Figure 8C:
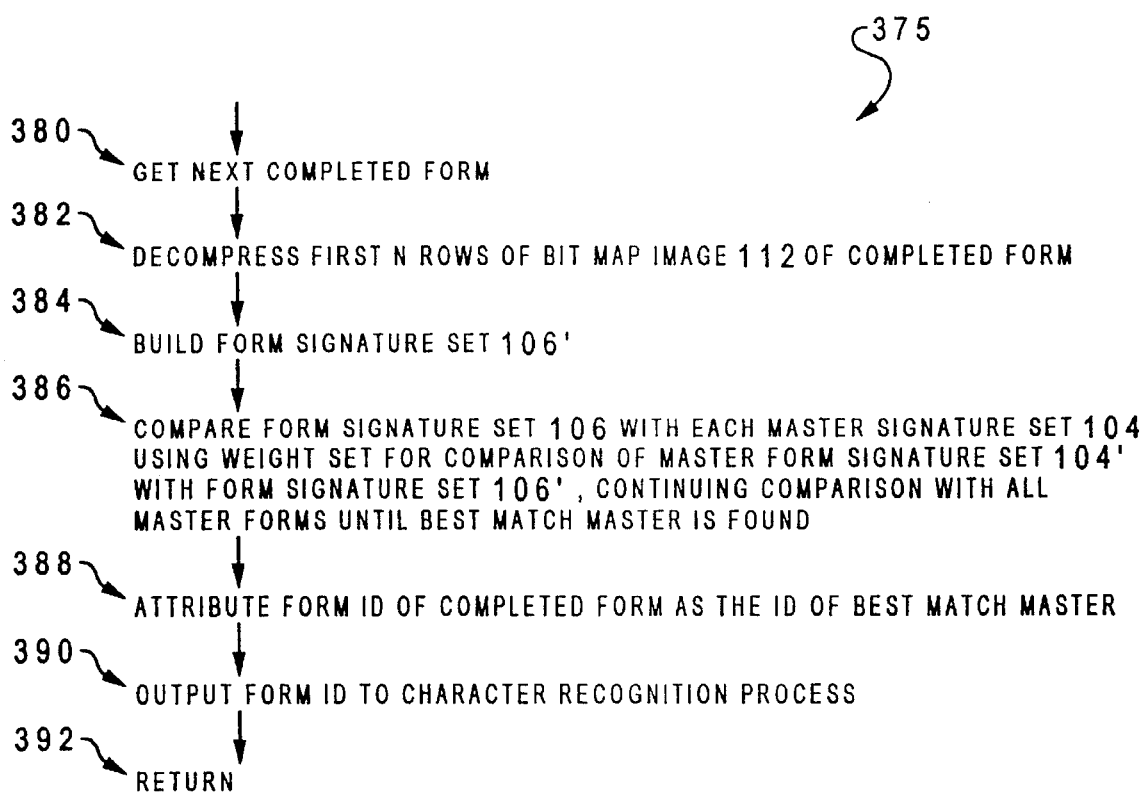
FIG. 8C shows the process of getting the next completed form when using the weight set, the program 375.

FIG. 8C shows the program 375 to get the next completed form. The program 375 goes from steps 380 to 392. Step 380 gets the next completed form. Step 382 decompresses the first N rows of the bit map image 112 of the completed form. Step 384 builds the form signature set 106'. Step 386 compares the form signature set 106 with each master signature set 104 using the weight set for comparison of the master form signature set 104' with the form signature set 106', continuing comparison with all master forms until the best match master is found. Step 388 attributes form ID of the completed form as the ID of the best match master. Step 390 outputs the form ID to the character recognition process. Step 392 then returns.

Figure 9:
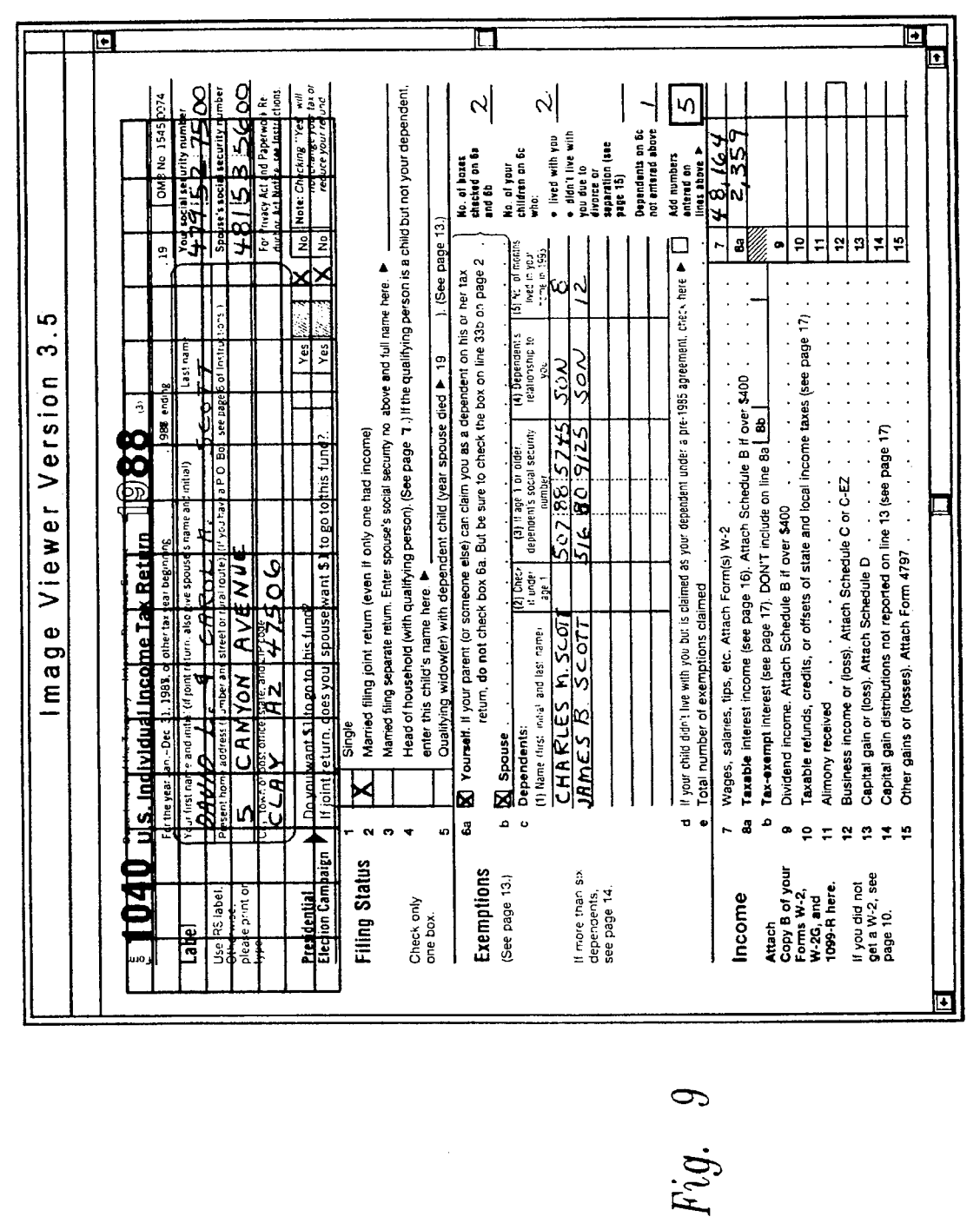

The resulting invention provides a more accurate forms recognition method which operates faster, and compensates for the average condition of the form in response to the character recognition program returning high error statistics for the form. The following are some examples in connection with FIG. 9, which is a bit map of a 1040 income tax form, showing the location of an eight row by 16 column cell array which is used for forms recognition, in accordance with the invention.

Example 1 is a description of the proposed steps for this method. Most of these steps have already been implemented in the prototype code. Also included is a simple example of how the process works.

Example 2 is a listing of the actual "forms signature" file with the prototype code. Seven different forms have been defined in a form set. For each form, there is a form name and a matrix of black pixel counts for the area of interest on the form. As can be seen by inspection that the matrices for the different form types are different. There are two versions of the "4562 back" form type which are slightly different.

Example 3 (refer to FIG. 9) is a listing of actual output from the prototype code. Included are runs from three different candidate images: a 1040 front, a 4562 back, and a Schedule B. Each run contains, among other things, the signature of the form (compare with those in the signature set file) and the output from four different methods for computing the difference between the candidate form and the forms in the signature set. The four differences are:

"0 deriv" - same as Method 1 in the text.

"1 deriv" - same as Method 4 in the text.

"squared" - same as Method 2 in the text.

"avg diff" - same as Method 3 in the text.

The results seem to show that the "squared" method is the best, as this emphasizes differences more than the other methods.

EXAMPLE 1

High-level Description of "Fast Forms Recognition" Steps:

Setup steps

For each form type to be included in the recognition list

Obtain a bit map image of the form type. This should be one that is most similar to those expected to be seen in the future, i.e. pick one that has average data on the form, average skew, average darkness, etc.

Decompress the first n rows of the image. The value of n is equal to the number of rows to skip on the top, plus the number of rows to process. Some rows should be skipped at the top because most forms have a white border at the top, which does not contain any form-specific information to store.

Build a 2-dimensional histogram of the form pixels using n rows and m columns of the image. The value of m is recommended to be the width of the form, not including any white borders which do not contain any form information. For example, a form which is 8 inches wide but with 1 inch white borders on each side should have 6 inches of pixels to process. The resulting histogram will be an n×m matrix of black pixel counts in the image. For simplicity, the pixel counts can be scaled down, such as by dividing each count by 10. Resolution independence can be achieved by scaling the counts based on the resolution of the input image. For 300 dpi images, for example, the pixel counts can be divided by 9. For 200 dpi images, the pixel counts can be divided by 4. This will produce comparable pixel counts regardless of the image resolution. Also, by not processing the borders of the image, any black borders commonly introduced during the scanning of the image will be properly ignored.

Store the pixel count matrix (hereafter named "form signature") in a file for later processing. Include the name of the form, also.

Repeat for each form type.

Form recognition steps

Decompress the first n rows of the candidate form.

Build a histogram in the same manner as above.

For each form type in the form signature set:

Compute the difference between the candidate form and the form in the form signature set. Methods for computing this difference are described below.

(Optional) If the difference is small enough, stop processing and return the current form type. This is assumed to be the form type of the candidate form.

Repeat for all form types or until done.

Choose the form type with the smallest difference between it and the candidate form. This is assumed to be the form type of the candidate form. (Optional) Mark the form as "unrecognized" if either a) the difference is too high, or b) the difference between the top choice and the second choice is too small (i.e. not confident enough between top choices).

(Optional) If the top 2 (or more) choices are close in total score (difference), then perform additional form recognition steps on just those form types. Or, if the top 2 (or more) choices are all part of the same form "class", then return just this form class as the recognized form class (not type). Example: there may be several varieties of a 1040 form (e.g. different years of the same form) which all score well. In this instance, the specific form type may not be recognized (e.g. 1988 vs 1989), but the general form class of "1040" is recognized.

Methods for computing difference

NOTE: Other, improved methods may be added in the future.

1) Sum the difference of all n×m matrix elements and divide by the greater of the total candidate or signature count.

2) Same as 1, but square each of the differences.

3) For each matrix element, divide the pixel count by the greater of the candidate or signature count. Sum these values.

4) Sum the first derivatives of the matrix elements, horizontally.

5) Sum the first derivatives of the matrix elements, vertically.

6) Sum the second derivatives of the matrix elements, horizontally.

7) Sum the second derivatives of the matrix elements, vertically.

EXAMPLE

Rows of interest on Form A look like:

```
+ - - - - - - - +
|     X         |
+ - - - - - - - +
```

Rows of interest on Form B look like:

```
+ - - - - - - - +
|  XX           |
+ - - - - - - - +
```

Contents of signature file:

FORM = "Form A"
SIGNATURE =
50 50 50 50 50
10 0 70 0 10
50 50 50 50 50
FORM = "Form B"
SIGNATURE =
25 25 25 25 25
90 20 0 20 90
25 25 25 25 25

Candidate form looks like:

```
+ - - - - - - - +
|  xx       x   |
+ - - - - - - - +
```

Candidate matrix looks like:

25 25 25 25 25
60 10 0 10 60
25 25 25 25 25

Difference calculations for some of the difference methods. Matrices shown am the difference matrices obtained with the appropriate method.

Method 1:
A                              B
 25 25 25 25 25                 0 0 0 0 0
 50 10 70 10 50                30 10 0 10 30
 25 25 25 25 25                 0 0 0 0 0
SUM = 440                      SUM = 80
DIFFERENCE = 440               DIFFERENCE = 80
TOTAL = 470                    TOTAL = 470
DEGREE OF DIFF = .93           DEGREE OF DIFF = .17
SIMILARITY = .07               SIMILARITY = .83
CHOSE FORM TYPE B Method 3:
A                              B
 .5 .5 .5 .5 .5                 0 0 0 0 0
 .8 1 1 1 .8                   .3 .5 0 .5 .3
 .5 .5 .5 .5 .5                 0 0 0 0 0
SUM = 9.6                      SUM = 1.6
DIFFERENCE = 9.6               DIFFERENCE = 1.6
TOTAL = 15                     TOTAL = 15
DEGREE OF DIFF = .64           DEGREE OF DIFF = .10
SIMILARITY = .36               SIMILARITY = .90
CHOSE FORM TYPE B

EXAMPLE 2

FORM_NAME_1040_1040-back
174 220 279 268 283 282 194 51 46 46 54 54 189 113 81 138
21 124 179 188 199 184 165 217 206 185 167 91 507 111 15 43
280 13 252 221 238 251 234 262 69 49 84 330 499 93 0 33
77 52 281 280 302 290 260 291 289 260 90 107 503 94 0 35
0 9 241 249 275 283 235 271 66 68 86 200 523 98 0 34
0 89 375 209 379 383 339 332 313 236 153 0 288 62 0 35
0 0 84 155 330 320 317 299 283 118 46 10 444 167 89 93
0 101 223 212 206 194 204 69 13 13 12 10 217 104 65 82
FORM_NAME = 1040_front
255 578 383 281 291 251 281 309 266 609 181 0 8 0 0 0
168 279 360 510 492 514 479 490 228 354 407 91 85 144 279 288
397 46 144 286 313 312 299 294 281 262 158 228 158 301 308 274
211 176 153 192 191 183 170 178 188 188 194 196 135 249 205 184
437 255 114 80 70 75 54 40 36 31 68 49 33 133 98 96
161 0 153 211 232 231 229 134 36 42 50 56 63 349 344 293
153 81 122 143 126 110 117 81 64 55 77 229 248 364 388 348
532 410 270 412 359 380 354 225 226 215 84 448 421 264 239 383
FORM_NAME = 4562_back
0 0 0 0 0 0 0 0 0 0 0 0 0 0 0 0
223 195 64 63 59 39 33 37 52 55 51 50 53 53 48 205
630 227 262 246 257 292 256 243 265 250 258 242 256 235 227 56
44 292 338 358 364 172 110 109 116 109 124 106 113 109 125 101
85 344 355 329 370 231 161 157 134 142 143 121 131 148 122 111
0 213 167 243 246 273 258 281 288 294 259 253 283 277 260 257
0 0 0 0 182 316 342 329 343 295 305 303 322 318 271 103
326 330 304 333 328 311 237 259 293 245 269 292 285 231 275 158
FORM_NAME = 4562_back2
155 112 0 0 0 0 0 0 0 0 0 0 0 0 0 157
450 285 270 290 290 288 239 247 289 261 264 284 278 264 256 66
200 278 280 279 293 81 60 44 33 38 26 33 40 37 41 14
0 373 412 377 421 246 195 206 190 188 202 176 193 189 172 144
83 317 230 311 257 280 262 265 270 275 221 236 228 264 246 199
0 0 0 0 245 389 396 381 415 384 367 402 386 399 326 151
260 260 257 269 257 280 177 258 211 212 209 261 241 195 253 79
190 168 182 163 282 124 320 168 244 209 247 183 148 108 171 78
FORM_NAME = 4562_front
79 150 144 75 0 0 0 212 242 227 81 0 0 0 128 531
511 397 327 198 88 81 140 308 301 283 242 94 93 88 282 364
293 207 165 22 0 0 0 0 0 0 0 0 0 36 225 155
139 267 234 214 170 54 48 44 51 62 65 60 54 60 51 55
125 133 85 75 72 66 62 51 63 68 74 74 68 67 62 67
369 536 401 311 318 226 219 197 215 194 192 189 213 213 198 207
192 140 184 157 266 280 309 307 321 319 326 317 275 95 96 91
128 154 167 249 251 85 54 156 262 240 113 114 135 86 215 250
FORM_NAME = scha
183 258 169 63 27 18 37 264 230 242 16 30 25 60 289 498
231 392 315 220 276 289 261 285 295 275 285 275 275 193 393 416
146 120 81 53 0 0 0 0 0 0 0 0 0 83 103 90
275 339 159 269 261 245 252 233 236 233 203 90 66 221 710 637
525 306 83 204 270 225 233 244 217 227 92 193 67 232 757 681
614 368 98 316 348 337 306 228 200 204 164 42 0 164 774 686
666 375 2 102 102 119 112 73 82 82 92 44 0 170 787 694
542 305 52 48 41 45 41 43 38 39 84 242 84 233 773 687
FORM_NAME = schb Method 1:
A                              B
 25 25 25 25 25                 0 0 0 0 0

```
179 159 165 165 164 171 168 157 166  29   0   0  67 197 197  96
 88  86  82 106  99 116  87  62  95  74  68  33  42  47 224  22
 92  84  80 175 408 330 324 355 365 350 320 309  27  39 224 165
184   0 372 376 359 410 365 390 356 380 331 383 365 366 401 341
276   0 383 364 392 384 382 414 380 402 394 368 395 270 316 280
140  20 245 237 238 224 249 234 195 213 197 204 155  23  19  18
356 171  72  62  58  56 110 257 154  29  25  21  38  60 210  32
  0   0 301 283 189 234 201 277 192 223 194 207 161  79  45  63
```

EXAMPLE 3

```
$ fr 1040_front-1 r
Loading image . . .
Looking at rows 150 to 694 of image . . .
Image resolution is 300 dpi, so this is about 2 inches
119 569 500 393 451 432 414 429 284 579 442   0   0   0   0   0
 64 127 163 444 386 413 381 392 251 148 380 250 180 235 313 359
411 157  61 291 410 420 414 374 468 519 209  84 110 319 455 447
361 400  60 282 413 313 303 279 310 279 244 280 215 370 390 397
532 230  78 295 298 453 385 423 194  41  46  55  62 304 341 411
262   0  64 274 471 321 362 297   0   0   0   0   0 309 432 430
314 308  92 307 360 321 328 156  77  73 111 259 593 341 324 329
383 396 352 275 252 286 261 240 243 232 143 167 466 261 185 335
0 deriv: 41% (23927 / 40357) sure for 1040_back
1 deriv: -1% (17755 / 17547) sure for 1040_back
squared: 56% (102452 / 228455) sure for 1040_back
avg diff: 42% sure for 1040_back
0 deriv: 65% (13749 / 38564) sure for 1040_front
1 deriv: 29% (10342 / 14556) sure for 1040_front
squared: 84% (37671 / 224358) sure for 1040_front
avg diff: 64% sure for 1040_front
0 deriv: 44% (23154 / 40725) sure for 4562_back
1 deriv: -2% (14221 / 13839) sure for 4562_back
squared: 57% (99413 / 230215) sure for 4562_back
avg diff: 47% sure for 4562_back
0 deriv: 46% (22464 / 41401) sure for 4562_back2
1 deriv: -3% (15214 / 14735) sure for 4562_back2
squared: 57% (101966 / 235830) sure for 4562_back2
avg diff: 51% sure for 4562_back2
0 deriv: 37% (25598 / 40511) sure for 4562_front
1 deriv: 4% (13878 / 14324) sure for 4562_front
squared: 50% (115388 / 230628) sure for 4562_front
avg diff: 42% sure for 4562_front
0 deriv: 47% (23443 / 43560) sure for scha
1 deriv: 12% (16025 / 18047) sure for scha
squared: 63% (107871 / 291510) sure for scha
avg diff: 47% sure for scha
0 deriv: 47% (21875 / 40983) sure for schb
1 deriv: 2% (15124 / 15320) sure for schb
squared: 62% (90444 / 233012) sure for schb
avg diff: 47% sure for schb
$ fr 4562_back-1 r
Loading image . . .
Looking at rows 150 to 694 of image . . .
Image resolution is 300 dpi, so this is about 2 inches
  0   0   0   0   0   0   0   0   0   0   0   0   0   0   5 152
252 184  82  73  80  62  65  62  87  91 121 161 178 226 224  50
521 278 311 358 397 269 236 216 236 213 173 146 111  79  57  13
  0 394 359 317 328 209 201 218 190 185 204 181 215 188 195 129
 83 296 276 245 296 106 103 138 158 177 184 214 225 266 247 191
  0 244 172 242 297 404 343 330 342 333 319 336 337 372 318 149
 64  61  57  54 192 263 299 322 366 294 245 306 296 216 256  78
261 261 265 285 331 294 250 208 209 157 226 184  73  71 158  80
0 deriv: 49% (15689 / 30450) sure for 1040_back
1 deriv: 1% (13492 / 13555) sure for 1040_back
squared: 66% (46503 / 136673) sure for 1040_back
avg diff: 46% sure for 1040_back
0 deriv: 45% (20085 / 35944) sure for 1040_front
1 deriv: -2% (11267 / 11016) sure for 1040_front
squared: 57% (80157 / 182904) sure for 1040_front
avg diff: 48% sure for 1040_front
0 deriv: 73% ( 7366 / 27043) sure for 4562_back
1 deriv: 35% ( 4208 / 6431) sure for 4562_back
squared: 91% (11124 / 119559) sure for 4562_back
avg diff: 72% sure for 4562_back
0 deriv: 69% ( 9270 / 29016) sure for 4562_back2
1 deriv: 34% ( 4925 / 7409) sure for 4562_back2
squared: 84% (21569 / 130738) sure for 4562_back2
avg diff: 71% sure for 4562_back2
0 deriv: 46% (16442 / 30145) sure for 4562_front
1 deriv: 10% ( 7807 / 8636) sure for 4562_front
squared: 66% (46777 / 134585) sure for 4562_front
avg diff: 47% sure for 4562_front
0 deriv: 38% (23911 / 38006) sure for scha
1 deriv: 3% (13176 / 13456) sure for scha
squared: 50% (116462 / 231169) sure for scha
avg diff: 38% sure for scha
0 deriv: 49% (16875 / 32695) sure for schb
1 deriv: -2% ( 9735 / 9453) sure for schb
squared: 68% (51137 / 155383) sure for schb
avg diff: 49% sure for schb
$ fr schb-1 r
Loading image . . .
Looking at rows 150 to 694 of image . . .
Image resolution is 300 dpi, so this is about 2 inches
266 263 262 259 231 250 220 219 184 106  41  29  74 219 185 140
323 230 283 334 230 306 237  46  37  40   0   0  42 197 245 190
 25   0   0   0 381 367 243 300 287 287 215 162  57 127 277 271
246  86 245 291 279 269 220 217 206 168 174 210  86  21 192 247
494   0 317 437 366 353 401 407 397 424 439 437 435 406 362 351
189   0 165 288 320 372 459 464 458 489 490 417 423 246 315 345
518 300 105 133 118  64  51 268 195  45  39  84 125  34  15  23
  0   1 116 205 205 243 270 217 186 138  99  54  49  48 195  65
0 deriv: 46% (18322 / 33672) sure for 1040_back
1 deriv: 2% (14308 / 14600) sure for 1040_back
squared: 60% (68471 / 168858) sure for 1040_back
avg diff: 46% sure for 1040_back
0 deriv: 46% (20930 / 38272) sure for 1040_front
1 deriv: 4% (12069 / 12507) sure for 1040_front
squared: 56% (93293 / 209924) sure for 1040_front
avg diff: 50% sure for 1040_front
0 deriv: 43% (20353 / 35442) sure for 4562_back
1 deriv: -5% (10294 / 9718) sure for 4562_back
squared: 59% (73302 / 178045) sure for 4562_back
avg diff: 42% sure for 4562_back
0 deriv: 51% (17083 / 34828) sure for 4562_back2
1 deriv: 1% (10577 / 10598) sure for 4562_back2
squared: 70% (51543 / 170053) sure for 4562_back2
avg diff: 48% sure for 4562_back2
0 deriv: 37% (22203 / 34931) sure for 4562_front
1 deriv: -5% (10991 / 10426) sure for 4562_front
squared: 53% (84122 / 175564) sure for 4562_front
avg diff: 37% sure for 4562_front
0 deriv: 42% (23050 / 39481) sure for scha
1 deriv: 0% (14286 / 14246) sure for scha
squared: 56% (110315 / 248474) sure for scha
avg diff: 43% sure for scha
0 deriv: 62% (12464 / 32395) sure for schb
1 deriv: 30% ( 7291 / 10415) sure for schb
squared: 81% (31796 / 164717) sure for schb
avg diff: 58% sure for schb
```

No definitions may be made to the specific embodiment disclosed. For example, a different number of rows may be decompressed to identify the specific document type.

Although a specific embodiment of the invention has been disclosed, it will be understood by those having skill in the art, that changes can be made to that specific embodiment without departing from the spirit and the scope of the invention.

What is claimed is:

1. In a data processing system, a method for forms recognition, comprising the steps of:

computing a master signature set for a new master form, by computing a pixel count value in each cell of an array of cells located in a portion of the master form;

scanning a completed form into the system, and compressing and buffering it as a compressed image;

decompressing only said portion of said compressed image of said completed form:

computing a form signature set for said decompressed portion of said completed form by computing a pixel count value in each cell of an array of cells located in said portion of said completed form;

comparing said form signature set with said the master signature set, and computing a difference matrix;

repeating said step of comparing said form signature set for each master signature set in the system, until a best match is found between said completed form and one master form; and selecting the best match as the master form type of the completed form.

2. In a data processing system, a method for forms recognition, comprising the steps of:

computing a master signature set for a new master form, by computing a pixel count value in each cell of an array of cells located in a portion of the master form;

scanning a completed form into the system, and compressing and buffering it as a compressed image;

decompressing only said portion of said compressed image of said completed form;

computing a form signature set for said decompressed portion of said completed form by computing a pixel count value in each cell of an array of cells located in said portion of said completed form;

comparing said form signature set with said the master signature set, and computing a difference matrix;

squaring each difference value in said difference matrix and summing the squares to obtain a sum;

dividing said sum a sum of the squares for said master signature set to obtain a ratio;

repeating said steps of comparing, squaring and dividing using said form signature set, for each master signature set in the system;

identifying a master form in said system having a lowest value for said ratio, as a most likely the best match among all master forms in said system; and selecting the best match as the master form type of the completed form.

3. In a data processing system, a method for forms recognition, comprising the steps of:

computing a master signature set for a new master form, by computing a pixel count value in each cell of an array of cells located in a portion of the master form;

scanning a completed form into the system, and compressing and buffering it as a compressed image;

decompressing only said portion of said compressed image of said completed form;

computing a form signature set for said decompressed portion of said completed form by computing a pixel count value in each cell of an array of cells located in said portion of said completed form;

comparing said form signature set with said the master signature set, and computing a difference matrix;

repeating said step of comparing said form signature set for each master signature set in the system, until a best match is found between said completed form and one master form;

selecting the best match as the master form type of the completed form;

monitoring error statistics reported by a character recognition program using an ID of said best match one master form;

identifying particular master form ID causing more than a predetermined threshold quantity of said error statistics, as having high error statistics;

starting a learning mode by storing a plurality of form signature sets for completed forms processed having said ID of said master form causing said high error statistics;

accumulating a predetermined quantity of forms signature sets having said ID;

analyzing said form signature sets by computing a standard deviation for a given cell location over all of said accumulated forms having said ID;

identifying a given cell location having a relatively large standard deviation in its pixel count, as having variable markings in said completed forms; and reducing the effect of said given cell in said matching process.

4. The method of claim 3, which further comprises:

reducing the sensitivity of the matching process to a cell, by modifying a weighting set associated with said master form's master signature;

said weighting set being an array of multiplicative values, one for each cell.

5. The method of claim 4, which further comprises:

initially assigning all of the values in the weighting set to have the value of unity;

during said comparing step, multiplying each value in the difference matrix by the weight for that cell in the weighting set.

6. The method of claim 5, which further comprises:

reducing the sensitivity of the matching process for a particular cell, by reducing the value of the weight for that cell;

whereby the system learns which of the cells are variable for a given master form, and those cells are made less important to the matching process for finding the ID of a completed form.

7. A data processing system for forms recognition, comprising:

first computing means for computing a master signature set for a new master form, by computing a pixel count value in each cell of an array of cells located in a portion of the master form;

scanning means for scanning a completed form into the system, and compressing and buffering it as a compressed image;

decompressing means for decompressing only said portion of said compressed image of said completed form;

said computing means computing a form signature set for said decompressed portion of said completed form by computing a pixel count value in each cell of an array of cells located in said portion of said completed form;

comparing means for comparing said form signature set with said the master signature set, and computing a difference matrix;

said comparing means repeating said comparing said form signature set for each master signature set in the system, until a best match is found between said completed form and one master form.

8. A data processing system for forms recognition, comprising:

first computing means for computing a master signature set for a new master form, by computing a pixel count value in each cell of an array of cells located in a portion of the master form;

scanning means for scanning a completed form into the system, and compressing and buffering it as a compressed image;

decompressing means for decompressing only said portion of said compressed image of said completed form;

said computing means computing a form signature set for said decompressed portion of said completed form by computing a pixel count value in each cell of an array of cells located in said portion of said completed form;

comparing means comparing said form signature set with said the master signature set, and computing a difference matrix;

said computing means squaring each difference value in said difference matrix and summing the squares to obtain a sum;

said computing means dividing said sum a sum of the squares for said master signature set to obtain a ratio;

said comparing means repeating said comparing, squaring and dividing using said form signature set, for each master signature set in the system;

said comparing means identifying a master form in said system having a lowest value for said ratio, as a most likely the best match among all master forms in said system.

9. In a data processing system, a system for forms recognition, comprising:

first computing means for computing a master signature set for a new master form, by computing a pixel count value in each cell of an array of cells located in a portion of the master form;

scanning means for scanning a completed form into the system, and compressing and buffering it as a compressed image;

decompressing means for decompressing only said portion of said compressed image of said completed form;

said computing means computing a form signature set for said decompressed portion of said completed form by computing a pixel count value in each cell of an array of cells located in said portion of said completed form;

comparing means for comparing said form signature set with said the master signature set, and computing a difference matrix;

said comparing means repeating said comparing said form signature set for each master signature set in the system, until a best match is found between said completed form and one master form;

monitoring means coupled to a character recognition means, for monitoring error statistics reported by said character recognition means using an ID of said best match one master form;

said monitoring means identifying particular master form ID causing more than a predetermined threshold quantity of said error statistics, as having high error statistics;

learning means for starting a learning mode by storing a plurality of form signature sets for completed forms processed having said ID of said master form causing said high error statistics;

accumulating means for accumulating a predetermined quantity of forms signature sets having said ID;

second computing means for analyzing said form signature sets by computing a standard deviation for a given cell location over all of said accumulated forms having said ID;

said second computing means identifying a given cell location having a relatively large standard deviation in its pixel count, as having variable markings in said completed forms;

said second computing means reducing the effect of said given cell in said matching process.

10. The system of claim 9, which further comprises:

said second computing means reducing the sensitivity of the matching process to a cell, by modifying a weighting set associated with said master form's master signature;

said weighting set being an array of multiplicative values, one for each cell.

11. The system of claim 10, which further comprises:

said second computing means initially assigning all of the values in the weighting set to have the value of unity;

said second computing means during said comparing step, multiplying each value in the difference matrix by the weight for that cell in the weighting set.

12. The system of claim 11, which further comprises:

said second computing means reducing the sensitivity of the matching process for a particular cell, by reducing the value of the weight for that cell;

whereby the system learns which of the cells are variable for a given master form, and those cells are made less important to the matching process for finding the ID of a completed form.

* * * * *